(12) United States Patent
Batchelor et al.

(10) Patent No.: US 12,478,422 B2
(45) Date of Patent: Nov. 25, 2025

(54) ELECTROSURGICAL SYSTEM FOR PREVENTING REUSE OF INSTRUMENTS

(71) Applicant: GYRUS ACMI, INC., Westborough, MA (US)

(72) Inventors: Kester Julian Batchelor, Mound, MN (US); Teo Heng Jimmy Yang, Heath (GB)

(73) Assignee: Gyrus ACMI, Inc., Westborough, MA (US)

( * ) Notice: Subject to any disclaimer, the term of this patent is extended or adjusted under 35 U.S.C. 154(b) by 682 days.

(21) Appl. No.: 17/812,017

(22) Filed: Jul. 12, 2022

(65) Prior Publication Data

US 2023/0035872 A1 Feb. 2, 2023

Related U.S. Application Data

(60) Provisional application No. 63/262,918, filed on Oct. 22, 2021, provisional application No. 63/227,510, filed on Jul. 30, 2021.

(51) Int. Cl.
*A61B 18/14* (2006.01)
*A61B 18/00* (2006.01)

(52) U.S. Cl.
CPC ............... *A61B 18/1445* (2013.01); *A61B 2018/00077* (2013.01); *A61B 2018/0013* (2013.01);
(Continued)

(58) Field of Classification Search
CPC ............ A61B 18/1206; A61B 18/1445; A61B 2018/00077; A61B 2018/0013;
(Continued)

(56) References Cited

U.S. PATENT DOCUMENTS 6,387,092 B1 * 5/2002 Burnside ................. A61B 18/14
606/41
7,147,634 B2 * 12/2006 Nesbitt .............. A61B 18/1402
606/41
(Continued)

FOREIGN PATENT DOCUMENTS

JP S61154659 7/1986
JP H0392182 4/1991
(Continued)

OTHER PUBLICATIONS

English Translation of JP 2683427, 1997.*
(Continued)

*Primary Examiner* — Michael F Peffley
(74) *Attorney, Agent, or Firm* — Schwegman Lundberg & Woessner, P.A.

(57) ABSTRACT

An electrosurgical generator configured to generate electrical energy to be applied to biological tissue via electrical communication with an electrosurgical instrument, the electrosurgical generator including a power source configured to activate to output the electrical energy to the electrosurgical instrument, a measurement circuit configured to measure a resistive value associated with an erodible coating deposited on a portion of the electrosurgical instrument, and a control circuit configured to compare a measured resistive value of the erodible coating to a threshold resistive value of the coating, and control activation of the power source based on the comparison between the measured resistive value and the threshold resistive value.

22 Claims, 14 Drawing Sheets

(52) U.S. Cl.
CPC ............... *A61B 2018/00136* (2013.01); *A61B 2018/00672* (2013.01); *A61B 2018/00708* (2013.01); *A61B 2018/00875* (2013.01); *A61B 2018/00898* (2013.01); *A61B 2018/00988* (2013.01)

(58) Field of Classification Search
CPC ........... A61B 2018/00136; A61B 2018/00404; A61B 2018/00589; A61B 2018/00595; A61B 2018/00601; A61B 2018/00607; A61B 2018/0063; A61B 2018/00672; A61B 2018/00708; A61B 2018/00875; A61B 2018/00898; A61B 2018/00988; A61B 2018/126; A61B 2018/1253; A61B 2018/1452; A61B 90/98
See application file for complete search history.

(56) References Cited

U.S. PATENT DOCUMENTS

| | | | | |
|---|---|---|---|---|
| 9,155,583 | B2* | 10/2015 | Bek | A61B 90/90 |
| 2003/0229344 | A1* | 12/2003 | Dycus | A61B 18/1445 |
| | | | | 606/51 |
| 2013/0116682 | A1* | 5/2013 | Koo | C23C 16/513 |
| | | | | 606/41 |

| | | | |
|---|---|---|---|
| 2020/0305960 | A1 | 10/2020 | Butler et al. |
| 2021/0307859 | A1 | 10/2021 | Nelson et al. |

FOREIGN PATENT DOCUMENTS

| | | | |
|---|---|---|---|
| JP | 2683427 | * | 11/1997 |
| JP | 2020080995 | | 6/2020 |
| JP | 2022500197 | | 1/2022 |
| JP | 7587553 | B2 | 11/2024 |
| JP | 2025013610 | A | 1/2025 |
| WO | 2020033950 | | 2/2020 |
| WO | 2020227519 | | 11/2020 |

OTHER PUBLICATIONS

"Japanese Application Serial No. 2022-118534, Notification of Reasons for Refusal mailed Sep. 26, 2023", w English Translation, 13 pgs.

"Japanese Application Serial No. 2022-118534, Response filed Dec. 14, 2023 to Notification of Reasons for Refusal mailed Sep. 26, 2023", w english claims, 12 pgs.

"Japanese Application Serial No. 2022-118534, Reasons for Refusal mailed Mar. 12, 2024", w English Translation, 8 pgs.

"Japanese Application Serial No. 2024-195764 Voluntary Amendment Filed Nov. 28, 2024", w/english claims, 11 pgs.

* cited by examiner

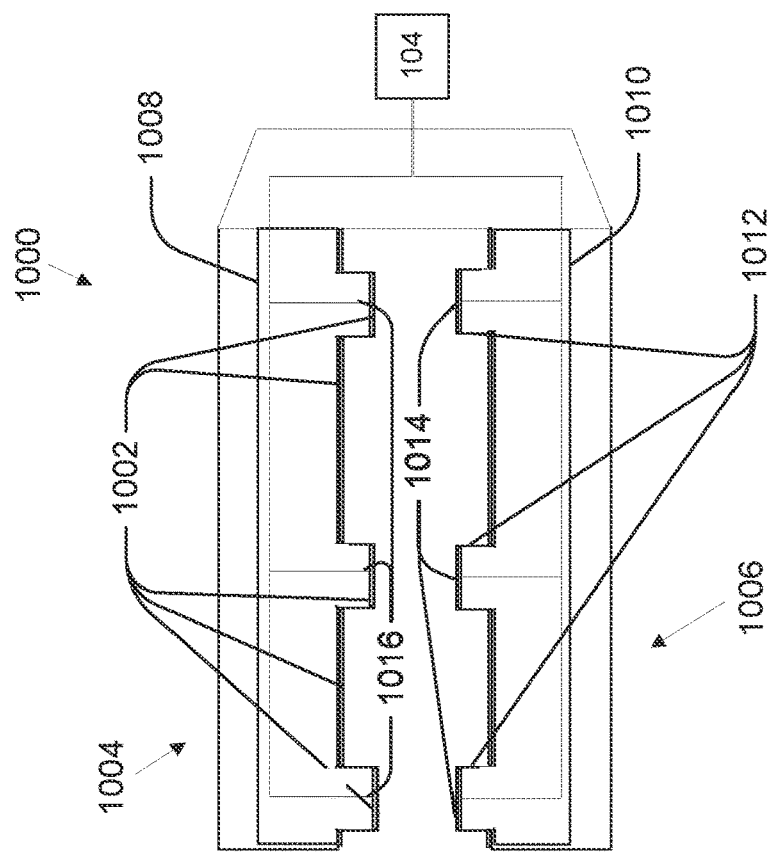
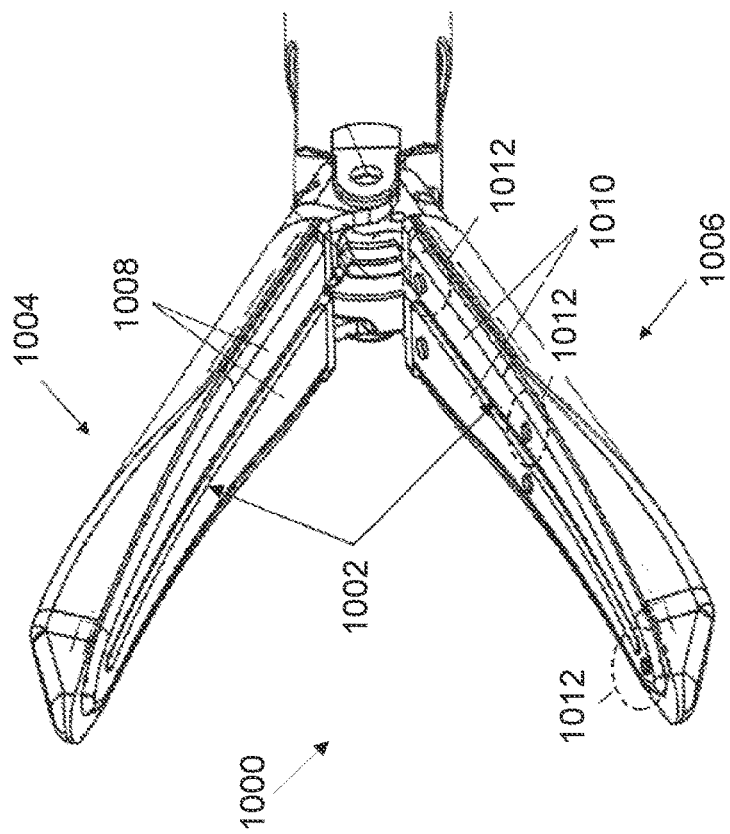
FIG. 12B
FIG. 12A

ELECTROSURGICAL SYSTEM FOR PREVENTING REUSE OF INSTRUMENTS

CROSS-REFERENCE TO RELATED APPLICATIONS

This application claims the benefit of priority to U.S. Provisional Patent Application Ser. No. 63/227,510, filed Jul. 30, 2021, and U.S. Provisional Patent Application Ser. No. 63/262,918, filed Oct. 22, 2021, the contents of which are incorporated herein by reference in their entireties.

TECHNICAL FIELD

This document pertains generally, but not by way of limitation, to electrosurgical systems and electrosurgical devices that can be used to produce a change in biological tissue.

BACKGROUND

Electrosurgery involves the application of electrical energy to biological tissue of a surgical patient, such as to cut, coagulate, cauterize, desiccate, or fulgurate the biological tissue. These electrosurgical techniques, among others, can be performed in a wide variety of surgical procedures, such as laparoscopic instruments including, but not limited to, appendectomy, cholecystectomy, colectomy, cystectomy, gastric banding, gastric bypass, hernia repair, nephrectomy, Nissen fundoplication, prostatectomy, sleeve gastrectomy, or still other procedures. Further, each of these procedures can include one or more phases involving the application of electrical energy, such as an interrogation phase, a heating phase, a drying phase, a cauterizing phase, or other phases. The electrical energy used in such procedures can be generated by an electrosurgical generator and output to an electrosurgical instrument in electrical communication with the electrosurgical generator.

For example, various electrosurgical instruments can be removably connected to the electrosurgical generator, such as including, but not limited to, a forceps, conductive spatulas, electrical pads, laparoscopic loops, or cutting devices. Accordingly, the electrosurgical instrument can be configured to electrically and mechanically engage the biological tissue to which the electrical energy is provided. Additionally, different surgical procedures can implement different applications of electrical energy to achieve results specific to a particular surgical procedure, such as by controlling or varying one or more electrical metrics to yield efficacious results in the biological tissue engaged by the electrosurgical instrument. The electrical metrics can be, but are not limited to, polarity (monopolar, bipolar), AC and/or DC, frequency, signal amplitude, attack and decay profiles, or combinations thereof.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

FIG. 12A illustrates a perspective view of an electrosurgical instrument with a hydrophobic layer deposited thereon.

FIG. 12B illustrates a cross-section view of an electrosurgical instrument with a hydrophobic layer deposited thereon.

DETAILED DESCRIPTION

Figure 1:
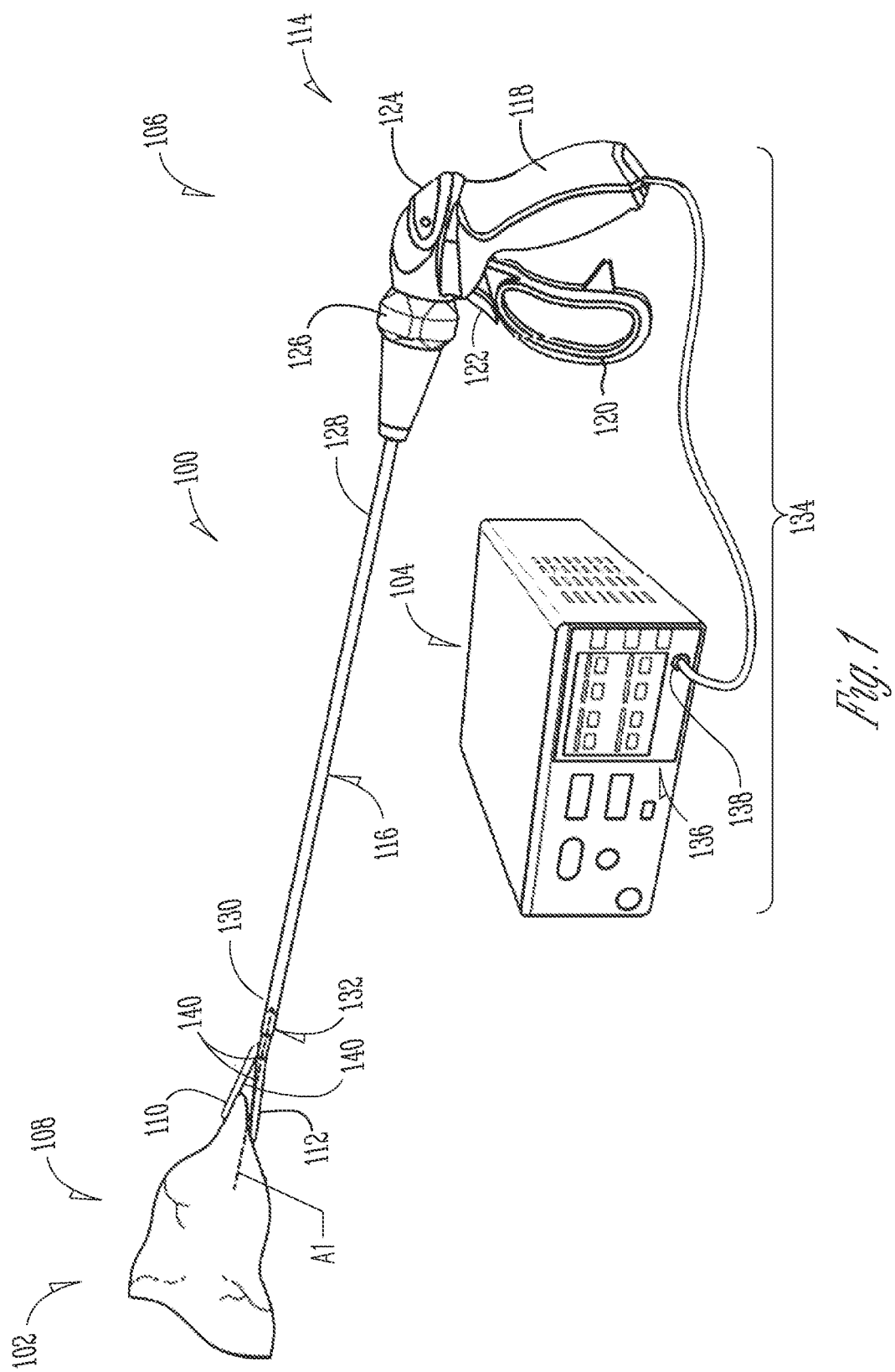
FIG. 1 illustrates a perspective view of an example electrosurgical system for providing electrical energy to biological tissue.

The following description and the drawings sufficiently illustrate specific examples to enable those skilled in the art to practice them. Other examples can incorporate structural, process, or other changes. Portions and features of some examples can be included in, or substituted for, those of other examples. Examples set forth in the claims encompass all available equivalents of those claims.

During electrosurgical procedures, coagulated fluids or solid tissue fragments can buildup on an electrosurgical instrument when the electrosurgical instrument is used to apply electrical energy to biological tissue. Electrical energy is converted to heat as a function of the electrical resistance of various biological tissues, causing fluids or solid tissues to adhere to portions of the electrosurgical instrument, such as to electrically assisted cutting or vessel sealing elements, or to mechanical grasping components. This can inhibit various aspects of an electrosurgical procedure. For example, coagulation of fluids on cutting element can increase surface adhesion, which can decrease the effectiveness of the cutting element and lead to tissue tearing. In another example, tissue buildup on electrodes can prevent an electrosurgical instrument from effectively sealing blood vessels. In further examples, blood or tissue buildup on any movable components of an electrosurgical instrument, such as pivotable forceps jaws or extendable blades, can compromise effective user manipulation or use thereof and lengthen the electrosurgical procedure.

In order to help address these issues, among others, a hydrophobic layer can be deposited on various components of an electrosurgical instrument. For example, the hydrophobic layer can include or define various coatings, surface structures, or combinations thereof, to reduce the surface adhesion of an electrosurgical instrument. For example, the hydrophobic layer can function as a non-stick layer, such as a comprising a nano-coating of polysiloxanes or fluorosilanes, or an etched surface forming or providing various nanostructures. However, during normal use of an electrosurgical instrument, the non-stick layer can be damaged by electrical energy received by the electrosurgical instrument, such as from an electrosurgical generator. For example, the hydrophobic layer can erode or otherwise degrade each time the electrosurgical generator outputs electrical energy to the electrosurgical instrument. Eventually, such as within the span of a single electrosurgical procedure, the hydrophobic layer can erode to a point where it no longer reduces the surface adhesion of the electrosurgical instrument.

As such, an operation limit or life of the hydrophobic layer can be quantified by a number of electrical energy signals that the electrosurgical generator outputs to the electrosurgical instrument. For example, the electrical energy used can be an intermittent or periodical signal output to the electrosurgical instrument upon individual or distinct activations of a power source of the electrosurgical generator. Additionally, many electrosurgical instruments are configured to be disposed of after being used in a surgical procedure for various reasons, such as, but not limited to, the difficulty involved in effective sterilization of the instrument, anticipated erosion of the hydrophobic layer on the instrument, expected wear of static or movable components of the instrument, or combinations thereof. Thus, it is possible for issues to arise if instruments are reprocessed and reused in subsequent electrosurgical procedures without adequate precautions being taken. For example, reprocessed instruments can have reduced functionality or can lead to patient infection if not effectively sterilized. As a result, an electrosurgical system capable of inhibiting or otherwise preventing use of an electrosurgical instrument after a predetermined limit or effective life of an electrosurgical instrument has been exceeded or has expired is desirable.

The disclosure of the present application can help to address these issues, among others, such as by providing an electrosurgical system capable of identifying and monitoring a predetermined limit of various electrosurgical instruments. The electrosurgical generator can include a control circuit configured to identify a predetermined limit (e.g., effective life) of an electrosurgical instrument in electrical communication with the electrosurgical generator. For example, during an electrosurgical procedure, the control circuit can count, aggregate, and/or store a number of electrical energy signals that have been output to the electrosurgical instrument in electrical communication with the electrosurgical generator, such as by controlling or otherwise monitoring a power (e.g. electrical energy) source of the electrosurgical generator.

The electrosurgical system can also intra-procedurally inform a user of a remaining effective life of the electrosurgical instrument in real time by comparing the counted, aggregated, and/or stored number of electrical energy signals that have been output to the electrosurgical instrument against the predetermined limit (e.g., effective life), such as to subsequently inhibit or otherwise prevent the power source of the electrosurgical generator from outputting electrical energy when the predetermined limit of the electrosurgical instrument has been exceeded. Further, the control circuit can inhibit or otherwise prevent reprocessing and reuse of various disposable electrosurgical instruments, such as by storing data on the electrosurgical instrument or an electrosurgical device including, or associated with, the electrosurgical instrument after the predetermined limit has been exceeded. For example, such data can be readable by another electrosurgical generator to prevent or otherwise prevent the electrosurgical generator from outputting electrical energy to the expired electrosurgical instrument in a subsequent procedure.

While the above overview discusses examples pertaining generally to non-stick coatings used on electrosurgical instruments, discussion of the following systems, devices, or methods are also applicable for use in other applications, such as to other coatings such as for purposes other than reducing friction or surface adhesion, or to wear components of various electrosurgical instruments. The above overview is intended to provide an overview of subject matter of the present patent application. It is not intended to provide an exclusive or exhaustive explanation of the invention. The description below is included to provide further information about the present patent application.

FIG. 1 illustrates a perspective view of an example electrosurgical system 100 for providing electrical energy to biological tissue 102. Also shown in FIG. 1 is a central axis A1. The electrosurgical system 100 can include an electrosurgical generator 104 and an electrosurgical device 106. The electrosurgical generator 104 can include a power source configured to generate electrical energy, such as arranged to be user-activatable to output electrical energy to the electrosurgical device 106. The electrosurgical device 106 can include an electrosurgical instrument 108. The electrosurgical instrument 108 can be, for example, any of various electrosurgical end effectors configured to engage the biological tissue 102, such as in any of various ways including, but not limited to, applying electrical energy to the biological tissue 102 via touching or direct contact with the biological tissue 102.

For example, such as shown in FIG. 1, the electrosurgical instrument 108 can be an electrosurgical forceps including a first jaw 110 and a second jaw 112. The first jaw 110 and the second jaw 112 can be configured to clamp, grasp, or otherwise retain a portion of the biological tissue 102 therebetween, such as to pass electrical energy through any portion of the biological tissue 102 located between the first jaw 110 and the second jaw 112. Other electrosurgical instruments can engage biological tissue 102 in other manners. For example, other types of electrosurgical instruments 108 can apply electrical energy to the biological tissue 102 in manners such as, but not limited to, clamping, cutting, radiating, surrounding, or penetrating the biological tissue 102.

The electrosurgical device 106 can further include a handpiece 114 and a shaft assembly 116. The handpiece 114 can include a handle 118, a gripping lever 120, a cutting trigger 122, an energy button 124, and a rotation wheel 126. The shaft assembly 116 can include a proximal portion 128 and a distal portion 130. The proximal portion 128 can be connected to the handpiece 114 and the distal portion 130 can be connected to the electrosurgical instrument 108. The shaft assembly 116 can extend distally from the handpiece 114 in longitudinal direction, such as to define the central axis A1. The shaft assembly 116 can allow a portion of electrosurgical device 106 (e.g., the electrosurgical instrument 108) to be inserted into anatomy a patient, while allowing a remaining portion of the electrosurgical device 106 (e.g., the handpiece 114 and the proximal portion 128 of the shaft assembly 116) to remain outside the patient. The shaft assembly 116 can include various conductive elements (e.g., wires, a conductive outer shaft and/or a conductive inner shaft, etc.) extending between the electrosurgical instrument 108 and any element or component of the handpiece 114, such as to enable electrical communication between the electrosurgical generator 104 and the electrosurgical instrument 108.

In some examples, the electrosurgical instrument 108 can detachably engage the shaft assembly 116, such as to be detached and disposed of after the conclusion of an electrosurgical procedure. In other examples, the electrosurgical instrument 108 can fixedly engage or be integrally formed with the shaft assembly 116. In such examples, the entire electrosurgical device 106, such as including the shaft assembly 116 and the handpiece 114, can be disposed of after the conclusion of an electrosurgical procedure. As such, the terms "electrosurgical device 106" and "electrosurgical instrument 108", can be used interchangeably in any example described below, at least as used in connection with the terms "predetermined limit" and "effective life". The shaft assembly 116 can include an elongated hollow member (e.g., a tubular outer shaft) enclosing a cutting element 132 and a mechanical linkage, such as to operably couple the cutting element 132 to the cutting trigger 122. For example, the cutting element 132 can a blade slidable or otherwise actuatable along the central axis A1. The cutting element 132 can cut, excise, or otherwise affect the biological tissue 102 or any object located between the first 110 and the second 112 jaws of the electrosurgical instrument 108.

The gripping lever 120, the cutting trigger 122, the energy button 124, and the rotation wheel 126 of the handpiece 114 are each configured to cause various actuations of the shaft assembly 116. The gripping lever 120 can be an actuator operably coupled to the electrosurgical instrument 108, such as via the mechanical linkage located within the shaft assembly 116. The gripping lever 120 can thereby be movable from an open position (illustrated in FIG. 1) to a closed position, in which the gripping lever 120 is moved proximally toward the handle 118, to cause the first jaw 110 or the second jaw 112 to pivot to contact or otherwise engage the biological tissue 102. The cutting trigger 122 can be an actuator operably coupled to the cutting element 132 located at the distal portion 130 of the shaft assembly 116, such as via the mechanical linkage extending within the shaft assembly 116. The cutting trigger 122 can thereby be movable from a retracted position (illustrated in FIG. 1) to a deployed position, in which the cutting trigger 122 is moved proximally toward handle 118, to cause the cutting element 132 to cut any portion of the biological tissue 102 located between the first 110 and the second 112 jaws of the electrosurgical instrument 108.

The rotation wheel 126 can be an adjustment feature operable to adjust the orientation or position of any of the shaft assembly 116, the cutting element 132, the first jaw 110, or the second jaw 112, relative to one another, such as around central axis A1. The rotation wheel 126 can thereby be rotated around the central axis A1 to cause any of the shaft assembly 116, the cutting element 132, the first jaw 110, or the second jaw 112, to rotate around, translate laterally relative one another, the central axis A1. The energy button 124 can be an input device or feature configured to cause a power (e.g., electrical energy) source of the electrosurgical generator 104 to activate to output electrical energy to the electrosurgical device 106. The energy button 124 can thereby be operable to cause the electrosurgical generator 104 to output electrical energy to the electrosurgical instrument 108, such as to one or more electrodes located on any of the first 110 or the second 112 jaws, the cutting element 132, a remote electrode pad, or various other elements or components of other electrosurgical instruments to cauterize, seal, or otherwise electrically affect the biological tissue 102. Detailed examples of electrosurgical devices are shown and described in U.S. Patent Application Publication No.: 2020/0305960, the entire contents of which are hereby incorporated by reference. Additionally, detailed examples of electrosurgical systems are shown in International Publication No.: WO 2020/227519, the entire contents of which are hereby incorporated by reference.

The electrosurgical system 100 can include a control circuit 134 (schematically illustrated in FIG. 1). The control circuit 134 can be integrated into the electrosurgical generator 104 or can be realized as a standalone external device or controller in electrical communication with the electrosurgical generator 104 and the electrosurgical device 106. For example, the control circuit 134 can be in direct (e.g., wired) or in wireless (e.g., network) connection with the electrosurgical generator 104 and the electrosurgical device 106. The control circuit 134 can control, or transfer to and receive data from, various components of the electrosurgical system 100. For example, the control circuit 134 can control the power source of the electrosurgical generator 104, such as to activate the power source to output electrical energy to the electrosurgical instrument 108. The control circuit 134 can also count, aggregate, and store each activation, including the length (e.g., timespan) of each activation, such as on various memory elements or components of the electrosurgical system 100.

The electrosurgical generator 104 can include a user interface 136, such as including various input and output devices. For example, the user interface 136 can include a visual display, such as a touch screen, or can include any of various gauges, dials, buttons, switches, or light emitters. In some examples, electrosurgical generator 104 can be coupled to external input devices, such as a keyboard or a mouse, or external output devices, such as a remote display screen. The control circuit 134 can be in electrical communication with the user interface 136 to control various functions or operations of the electrosurgical generator 104. For example, parameters or electrical metrics of the electrical energy output by the power source of the electrosurgical generator 104 can be configured via inputs to the user interface 136, such as to configure the electrical energy to resistively heat the biological tissue 102 to cauterize and seal blood vessels.

The electrosurgical system 100 can include an electrical connector 138. The electrical connector 138 can detachably connect the electrosurgical generator 104 to the electrosurgical device 106, such as to establish electrical communication therebetween. For example, the electrical connector 138 can be any of various electrical connectors suitable to transfer radiofrequency (RF) energy from the electrosurgical generator 104 to the electrosurgical device 106. In some examples, the electrical connector 138 can be a component of the electrosurgical device 106, such as one configured to engage an instrument interface associated with the electrosurgical generator 104. In other examples, the electrical connector 138 can be realized between two separate electrical connectors, such as a male connector associated with the electrosurgical device 106 and a female connector associated with the electrosurgical generator 104, or vice versa.

The electrical connector 138 can also establish a data link between the electrosurgical generator 104 and the electrosurgical device 106. For example, the control circuit 134 of the electrosurgical generator 104 can be configured to transfer data to, or receive data from, a memory of the electrosurgical device 106 upon the establishment of an electrical connection therebetween, such as to identify a predetermined limit (e.g., effective life) of the electrosurgical device 106 connected to the electrosurgical generator 104. The electrosurgical instrument 108 can include a hydrophobic layer 140. The hydrophobic layer 140 can be a coating, a surface structure, or a combination thereof, such as a material configured to serve as a non-stick layer by reducing surface adhesion between a surface of the electrosurgical instrument 108 and a surface of the biological tissue 102. For example, as shown in FIG. 1, the hydrophobic layer 140 can be deposited or otherwise formed on any of various surfaces of the first jaw 110, the second jaw 112, the cutting element 132, or an inner surface of shaft assembly 116, such as in which the cutting element 132 resides.

In some examples, the hydrophobic layer 140 can define the predetermined limit (e.g., effective life) of the electrosurgical instrument 108. In such an example, the hydrophobic layer 140 can erode or linearly degrade as a function of normal electrosurgical use, such as fractionally decreasing in thickness each time the power source of the electrosurgical generator 104 activates to output electrical energy to the electrosurgical instrument 108, or otherwise over an active time period during which the power source is outputting electrical energy to the electrosurgical instrument 108. The predetermined limit of the electrosurgical instrument 108, in some examples, can thereby be quantified as an aggregate (e.g., total) number of power source activations or aggregate (e.g., total) active time period before the hydrophobic layer 140 is known to fail, or no longer effectively reduce the surface adhesion between the electrosurgical instrument 108 and the biological tissue 102. In some examples, the predetermined limit can be an effective time window, such as a period of time (e.g., hours or minutes), in which an electrosurgical procedure is to be completed, such as beginning after a first engagement or first connection of the electrosurgical instrument 108 to, or beginning after first disengagement or first disconnection of the electrosurgical instrument 108 from, the electrosurgical generator 104. The electrosurgical system 100 can thereby identify and monitor (e.g., track) the predetermined limit of the electrosurgical instrument 108 in preparation for, or intra-procedurally during, an electrosurgical procedure.

The electrosurgical system 100 can further prevent use of the electrosurgical device 106 when the predetermined limit of the electrosurgical instrument 108 has been exceeded. For example, as the control circuit 134 can count, aggregate, and store the number and length of the power source activations output to the electrosurgical instrument 108, the control circuit 134 can recognize when the predetermined limit of electrosurgical instrument 108 has been exceeded, and in response, the control circuit 134 can prevent activation of the power source, such as until a different (e.g., a non-expired) electrosurgical instrument 108 is connected to electrosurgical generator 104. Additionally, when the predetermined limit of the electrosurgical instrument 108 has been exceeded, the control circuit 134 can transfer data to memory of the electrosurgical device 106 or electrosurgical instrument 108, such as configured to prevent subsequent reuse of the electrosurgical instrument 108 after the electrosurgical procedure has concluded. For example, if the electrosurgical instrument 108 is later reprocessed and coupled to a different electrosurgical generator, the control circuit 134 can receive (e.g., read) the stored data and prevent the power source from activating to prevent electrical energy from being output to the electrosurgical instrument 108.

In the operation of some examples of the electrosurgical system 100, a user can first connect the electrosurgical device 106 to the electrosurgical generator 104, such as using the electrical connector 138. The electrosurgical generator 104 can then interact with the electrosurgical device 106, such as to identify a predetermined limit of the electrosurgical instrument 108. Next, the user can apply electrical energy to the biological tissue 102, such as by operating the energy button 124 of the electrosurgical device 106 when the electrosurgical instrument 108 is touching or otherwise engaging the biological tissue 102. The control circuit 134 can concurrently count and aggregate each activation, such as including the length of each activation, of the power source on a memory of the electrosurgical generator 104 or the electrosurgical device 106. Finally, upon recognizing the predetermined limit has been exceeded, the control circuit 134 can prevent the power source from activating to prevent output of electrical energy to the electrosurgical instrument 108. In still further examples, the control circuit 134 can allow application of electrical energy to the biological tissue 102 after the predetermined limit of the electrosurgical instrument 108 has been exceeded, such as provided that electrosurgical instrument 108 has not been disconnected from the electrosurgical generator 104, or has not been disconnected from the electrosurgical generator 104 for a period of time exceeding a predetermined effective time window measured by a clock or timer of the control circuit 134.

The electrosurgical system 100 can thereby provide various benefits to both a user and a patient during an electrosurgical procedure. For example, the electrosurgical system 100 can identify and monitor a predetermined limit of a disposable electrosurgical instrument or device, such as to prevent a user from inadvertently exceeding an effective life of the electrosurgical instrument during an electrosurgical procedure. This can help to improve patient outcomes in various electrosurgical procedures by preventing tissue tearing or incomplete vessel sealing caused by failure of a hydrophobic layer (e.g., non-stick coating) deposited thereon, such as due to adhered tissue interfering with operation of the device. The electrosurgical system 100 can also prevent reuse of an expired electrosurgical instrument after the predetermined limit (e.g., effective life) of the electrosurgical instrument has been exceeded. This can help to reduce post-operative patient infections due to insufficient sterilization of a reprocessed electrosurgical instrument, and prevent patient trauma caused by diminished functionality of the reprocessed electrosurgical instrument, such as in instances where such diminished functionality may be difficult or impossible to ascertain before engaging anatomy with an expired electrosurgical instrument.

Figure 2:
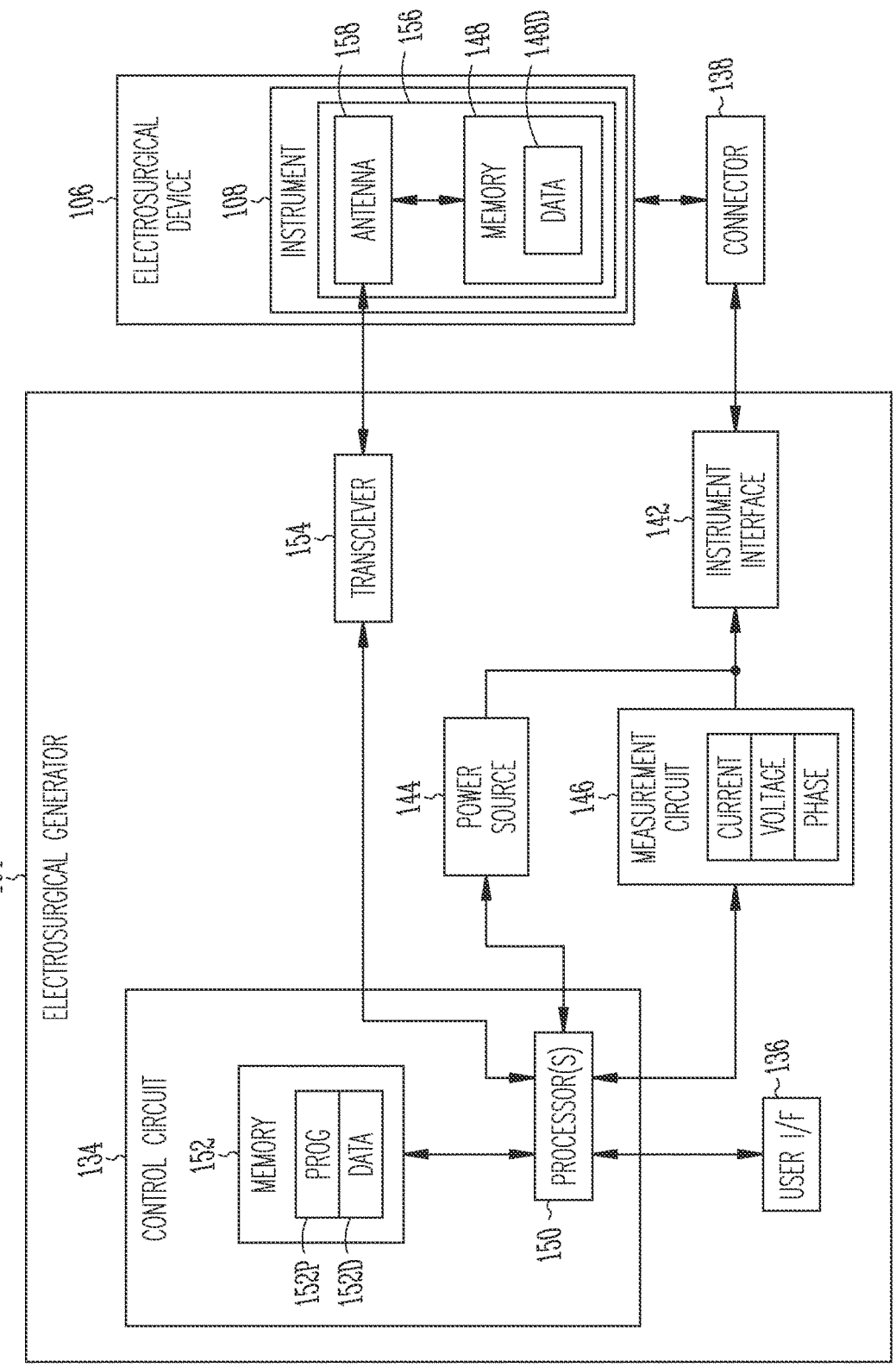
FIG. 2 illustrates a block diagram of an example electrosurgical system.

FIG. 2 illustrates a block diagram of an example electrosurgical system 100. FIG. 2 is discussed with reference to the electrosurgical system 100 shown in, and described above with regard to, FIG. 1. In some examples, the electrosurgical system 100 can be realized using the elements shown in FIG. 2. In other examples, the electrosurgical system 100 can include various other elements. As illustrated in FIG. 2, the electrosurgical generator 104 can include the user interface 136, an instrument interface 142, a power source 144, and a measurement circuit 146; and the electrosurgical device 106 can include the electrosurgical instrument 108 and a memory 148. The memory 148 can be located on or within any of various components of the electrosurgical device 106, such as including, but not limited to, the electrosurgical instrument 108, the electrical connector 138, or the instrument interface 142. As such, the terms "electrosurgical device 106" and "electrosurgical instrument 108", can be used interchangeably in any example described below, at least as used in connection with the term "memory 148", and the terms "predetermined limit" and "effective life" for the reasons previously stated out above.

In some examples, the control circuit 134 can be an element included within or otherwise integrated into the electrosurgical generator 104. In other examples, the control circuit 134 be realized using a combination of elements from the electrosurgical generator 104 and the electrosurgical device 106. In still further examples, the control circuit 134 can be a standalone control device located externally to, and in electrical communication with, the electrosurgical generator 104 and the electrosurgical device 106. The control circuit 134 can be in wired (e.g., direct) communication with the electrosurgical generator 104. Additionally, or alternatively, the control circuit 134 can be in wireless (e.g., network) communication with the electrosurgical generator 104, such as to transmit or receive data via near-field communication (NFC), Bluetooth (e.g., Bluetooth Low Energy), Wi-Fi, 3GPP LTE, or any other healthcare compliant wireless communication protocol.

The control circuit 134 can include at least a processor 150 and a memory 152. In some examples, the processor 150 can include a timer and/or a clock. In other examples, the timer and/or clock can be an element, or included in a device, separate from the processor 150. The processor 150 can include a hardware processor, such as a central processing unit (CPU), a graphics processing unit (GPU), a hardware processor core, or any combination thereof. The processor 150 can include any one or more of a microprocessor, a control circuit, a digital signal processor (DSP), an application specific integrated circuit (ASIC), a field-programmable gate array (FPGA), or other equivalent discrete or integrated logic circuitry.

The processor 150 can thereby be capable of receiving, retrieving, and/or processing program instructions, such as stored on the memory 152 (e.g., on program memory 152P), or receiving, retrieving, and/or processing data stored on the memory 152 (e.g., on data memory 152D) or on the memory 148 (e.g., on data memory 148D) to implement or otherwise execute any of, but not limited to, the various functions or operations of the electrosurgical system 100 described in the following examples. In some examples, the processor 150 can receive, retrieve and/or process instructions or data to activate or deactivate the power source 144. The power source 144 can generate and output electrical energy when activated; and can cease to generate and output electrical energy when deactivated. In some examples, the processor 150 can receive, retrieve and/or process instructions or data to cause the power source 144 to repeatedly activate and deactivate, such as to output intermittent, periodic, cyclical, or otherwise variable electrical energy.

In some examples, the processor 150 can receive, retrieve and/or process instructions or data to cause the processor 150 to match or otherwise associate the electrosurgical instrument 108 in electrical communication with the electrosurgical generator 104 with data located on the memory 148 and/or 152. For example, the memory 152 can include identifying data associated with the electrosurgical instrument 108, and the memory 148 can include thereon, or be in network communication with, a library of information (e.g. database) relating to various different electrosurgical instruments (such as those shown in, but not limited to, FIGS. 4-7) and their respective predetermined limits. In such examples, the processor 150 can first receive, retrieve and/or process instructions or data to, upon connection of the electrosurgical instrument 108 to the electrosurgical generator 104, cause the processor 150 to obtain the identifying data from the memory 152 of the electrosurgical instrument 108. The processor 150 can then receive, retrieve and/or process instructions or data to look up an individual data set (e.g., data base entry) defining or otherwise including the predetermined limit of the electrosurgical instrument 108, such as by matching the identifying data of the electrosurgical instrument 108 to associated data stored on the memory 148. In other examples, the processor 150 can receive, retrieve and/or process instructions or data to cause the processor 150 to directly retrieve the predetermined limit of the electrosurgical instrument 108 from the memory 152 of the electrosurgical instrument 108. Thus, the control circuit 134 can be configured to read information from the electrosurgical instrument 108 to identify or otherwise recognize the type or class of instrument that the electrosurgical instrument 108 belongs to, and accordingly recognize, for example, the maximum aggregate number of activations of the power source 144, or the maximum active time period, the electrosurgical instrument 108 can be subject to before output of electrical energy to the electrosurgical instrument 108 will be inhibited or otherwise prevented by the control circuit 134.

In some examples, the processor 150 can receive, retrieve and/or process instructions or data to count or otherwise record each consecutive activation of the power source 144 to store an aggregate (e.g. total) number of power source activations associated with an individual electrosurgical instrument 108, such as on the memory 148 or 152. In some examples, the processor 150 can receive, retrieve and/or process instructions or data to count or otherwise record the length (e.g., timespan) of each consecutive activation of the power source 144 to store an aggregate (e.g., total) active time period of the electrosurgical instrument 108, such as on the memory 148 or 152. In some examples, the processor 150 can receive, retrieve and/or process instructions or data to delete the stored aggregate number from the memory 152, such as upon disconnection of the electrosurgical instrument 108 from the electrosurgical generator 104. In some examples, the processor 150 can receive, retrieve and/or process instructions or data to continuously (e.g., in real time) or periodically compare the stored aggregate number against a predetermined limit of the electrosurgical instrument 108. In some examples, the processor 150 can receive, retrieve and/or process instructions or data to disable the power source 144, such as by interrupting signal communication between any input devices of the electrosurgical system 100, such as the electrosurgical device 106 or the user interface 136, and the power source 144.

In some examples, the predetermined limit can be a maximum number of power source activations receivable by the electrosurgical instrument 108. In such examples, the maximum number of power source activations can be less than, equal to, or greater than an aggregate number of power source activations at which the hydrophobic layer 140 fails, or no longer reduces the surface adhesion between the electrosurgical instrument 108 and the biological tissue 102. In other examples, the predetermined limit of the electrosurgical instrument 108 can be an aggregate number of power source activations received by the electrosurgical instrument 108 less than, equal to, or greater than an aggregate number of power source activations at which other coatings or components of the electrosurgical device 106 or the electrosurgical instrument 108 fail, or are estimated to fail, or exhibit reduced or diminished functionality. In some examples, the predetermined limit can be a maximum active time period of the electrosurgical instrument 108. In such examples, the maximum active time period can be less than, equal to, or greater than an aggregate (e.g., total) active time period at which the hydrophobic layer 140 fails, or no longer reduces the surface adhesion between the electrosurgical instrument 108 and the biological tissue 102. In other examples, the predetermined limit of the electrosurgical instrument 108 can be an aggregate active time period less than, equal to, or greater than an aggregate active time period at which other coatings or components of the electrosurgical device 106 or the electrosurgical instrument 108 fail, are estimated to fail, or exhibit reduced or diminished functionality.

In some examples, the predetermined limit can alternatively be, or can additionally include, an effective time window after a first engagement, or first connection, of the electrosurgical instrument 108 to the electrosurgical generator 104, after which the predetermined limit will be exceeded. In some examples, the predetermined limit can be a time period, such as an effective time window after a first disengagement, or first disconnection, of the electrosurgical device 106 or the electrosurgical instrument 108 from the electrosurgical generator 104, after which the predetermined limit will be exceeded. In such examples, the effective time window can be or additionally include, but is not limited to, a period of time less than, equal to, or greater than, a number of hours or minutes in which a surgical procedure is to be completed. For example, the effective time window can be, but is not limited to, about 1-60 minutes, 2-5 hours, or 6-12 hours. In still further examples, the predetermined limit can include a combination of any of the example predetermined limits described above, such as including two or more of the maximum number of power source activations, the maximum active time period, or the effective time window. In such examples, the predetermined limit can be exceeded based on any, or all, of the example predetermined limits. In view of the above, the terms "exceed" or "exceeding" can generally represent any threshold value set below, at, or above any of the example predetermined limits described above.

In some examples, the processor 150 can receive, retrieve and/or process instructions or data to cause the power source 144 to activate to generate and output electrical energy according to a predetermined electrotherapeutic schedule retrieved from the memory 148 or 152, such as including by various electrical parameters or metrics defining electrical energy to be output to a specific electrosurgical instrument for a specific electrosurgical procedure or electrosurgical technique. The measurement circuit 146 can be configured to measure one or more electrical parameters of the biological tissue 102 engaged by the electrosurgical instrument 108, or the electrical energy output by the power source 144, such as by sensing any of a current, voltage, or phase value using sensor or other electrically conductive components of the electrosurgical instrument 108.

In some examples, the processor 150 can further receive, retrieve and/or process instructions or data to compare any electrical parameters or metrics measured by the measurement circuit 146 against the predetermined electrotherapeutic schedule. In response, the processor 150 receive, retrieve and/or process instructions or data to execute commands to the power source 144 and/or the measurement circuit 146, such as to alter the parameters or metrics of the electrical energy output by the power source 144 to conform to the electrotherapeutic schedule, such as to achieve a desired electrosurgical result. In some examples, the processor 150 can receive, retrieve and/or process instructions or data to cause the power source 144 to activate, or repeatedly active, upon one or more user inputs to the electrosurgical device 106 or the electrosurgical generator 104, such as upon operation of the energy button 124 of the electrosurgical device 106. In some examples, the processor 150 can receive, retrieve and/or process instructions or data to inhibit or otherwise prevent the power source 144 from activating, or repeatedly activating, upon one or more user inputs to the electrosurgical device 106 or the electrosurgical generator 104, such as upon operation of the energy button 124 of the electrosurgical device 106 after the processor 150 has stored (on the memory 148 or 152) a predetermined maximum number of power source activations (e.g., electrical energy outputs) receivable by electrosurgical instrument 108. For example, the processor 150 can receive, retrieve and/or process instructions or data to interrupt signal communication between the electrosurgical device 106 and the power source 144 to inhibit or otherwise prevent operation of the energy button 124 from causing activation of the power source 144. In some examples, the processor 150 can inhibit or otherwise prevent activation of the power source 144 until a different (e.g., a non-expired) electrosurgical instrument 108 is connected to electrosurgical generator 104.

In some examples, the processor 150 can receive, retrieve and/or process instructions or data to cause the power source 144 to activate, or repeatedly active, after the processor 150 has inhibited or otherwise prevented the power source 144 from activating in response to storing the maximum number of power source activations receivable by the electrosurgical instrument 108 or the maximum active time period of the electrosurgical instrument 108. In some such examples, the processor 150 can receive, retrieve and/or process instructions or data to determine if the electrosurgical device 106 or electrosurgical instrument has been previously disconnected or otherwise disengaged from the instrument interface 142 and/or the electrical connector 138, such as after a first engagement with, or first connection to, the electrosurgical generator 104. In other such examples, the processor 150 can receive, retrieve and/or process instructions or data to determine if an effective time window has been exceeded or has otherwise elapsed.

In response to a determination by the processor 150 that the electrosurgical device 106 or electrosurgical instrument 108 has not been previously disconnected or disengaged, or that the effective time period window has not yet elapsed, the processor 150 can receive, retrieve and/or process instructions or data to reenable activation of the power source 144, such as to output electrical energy to the electrosurgical device 106 upon user operation of the energy button 124, after the predetermined limit of the electrosurgical instrument 108 coupled to the electrosurgical device 106 has been exceeded. This can prevent, for example, reuse of an expired electrosurgical instrument after an electrosurgical procedure has concluded, while concurrently allowing a user to continue applying electrical energy to tissue in situations where a replacement instrument may not be readily available, or where intraprocedural replacement of an instrument is difficult or impractical.

In some examples, as discussed above, the predetermined limit can alternatively be, or can additionally include, a time period, such as a maximum effective time window beginning after a first engagement or first connection, or beginning after a first disconnection or disengagement of the electrosurgical instrument 108 to or from the electrosurgical generator 104. In such examples, the such as upon a second engagement, or reconnection, of the electrosurgical instrument 108 to the electrosurgical generator 104, and thereby to the control circuit 134, the processor 150 can receive, retrieve and/or process instructions or data to determine if the reconnection or second engagement was made within the maximum effective time window. For example, it can be desirable to intra-procedurally disconnect or reconnect the electrosurgical instrument 108, such as to reboot the electrosurgical generator 104, move the electrosurgical device 106 to another connection port of the electrosurgical generator 104, or temporarily utilize a different electrosurgical instrument. In response to a determination by the processor 150 that the electrosurgical instrument 108 has been reconnected or reengaged within the maximum effective time window, the processor 150 can receive, retrieve and/or process instructions or data to reenable activation of the power source 144, such as to output electrical energy to the electrosurgical device 106.

The user interface 136 can communicate or transfer information between the electrosurgical system 100 and a user (e.g., a surgeon or technician). For example, the user interface 136 can include input and output devices such as various displays, audible signal generators, switches, buttons, a touchscreen, a mouse, a keyboard, etc. The user interface 136 can include a communications module, such as including, or in addition to, any of various input and output devices. The user interface 136 can utilize a communications module to, for example, communicate with external devices via one or more networks, such as one or more wireless or wired networks, or both. The communications module can include a network interface card, such as an Ethernet card, an optical transceiver, a radio frequency transceiver, or any other type of device that can send and receive information. Other examples of such network interfaces can include Bluetooth, 3G, 4G, and Wi-Fi radio computing devices as well as Universal Serial Bus (USB) devices. In some examples, the user interface 136 can include the output device 200 shown in, and discussed below with regard to, FIG. 3.

In some examples, the processor 150 can receive, retrieve and/or process instructions or data to implement selective user control over the power source 144, such as to allow user configuration, via inputs to the user interface 136, of parameters or metrics of the electrical energy generated and output by the power source 144 upon activation of the power source 144. In some examples, the processor 150 can receive, retrieve and/or process instructions or data to cause the user interface 136 to generate and output audible or a visual alert to a user. In such examples, the audible or visual alert can correspond to a predetermined, or user-selectable, aggregate number of power source activations stored by the processor 150, such as to provide a user with an indication of a remaining effective life of the electrosurgical instrument 108 before a maximum number of power source activations (defining the predetermined limit of the electrosurgical device 106 or electrosurgical instrument 108) is exceeded; or to provide a user with an indication that the predetermined limit has been exceeded.

In some examples, the control circuit 134 can be in electrical communication with an output circuit of the electrosurgical generator 104. The output circuit can be configured to enable transmission of electrical energy generated by activation of the power source 144 to be output to the electrosurgical device 106. For example, the output circuit can be realized in the form of the power source 144 and the instrument interface 142. The instrument interface 142 can include any of various signal drivers, buffers, amplifiers, or ESD protection devices, or an output terminal, such as engageable by the electrical connector 138. For example, the instrument interface 142 can be directly or indirectly engaged by elements or components of the electrosurgical device 106 or the electrical connector 138 to enable transmission of electrosurgical energy, such as radiofrequency (RF) energy, to the biological tissue 102 via the electrosurgical instrument 108.

In additional examples, electrosurgical system 100 can include a wireless communication circuit, such to enable wireless electrical communication between the control circuit 134 and the electrosurgical device 106 or electrosurgical instrument 108. For example, the wireless communication circuit can be realized in the form of a generator component 154 located on or within the control circuit, such as on or within electrosurgical generator 104 in some examples, and an instrument component 156 located on or within the electrosurgical device 106 or the electrosurgical instrument 108. As illustrated in FIG. 2, the generator component 154 can be, for example, but not limited to, a radio frequency identification (RFID) or near-field communication (NFC) wireless transceiver; and instrument component 156 can be, for example, but not limited to, a tag including an antenna 158 and a memory, such as the memory 148. For example, the instrument component 156 be a radio frequency identification (RFID) or near-field communication (NFC) passive inlay or hard tag, such as made from any of various materials including, but not limited to, metals, plastics, or composites.

In some examples, the instrument component 156 can be an active tag, such as including a battery or other power source realized separate from the electrosurgical generator 104. In the operation of any such examples, the processor 150 can receive, retrieve and/or process instructions or data to cause the transceiver to wirelessly receive or transmit data to the memory 148 using any of various wireless protocols. In some examples, the generator component 154 can be configured to transmit or receive data the memory 152 from a range of about, but not limited to, 1-10 centimeters, 0.1-1 meters, or 1-30 meters. The reception or transmission range of the generator component 154 can be dependent, for example, on the frequency or wavelength of tagging of the instrument component 156, such as very-high frequency (VHF), ultra-high frequency (UHF), high frequency (HF), or low frequency (LF) ranges.

In some examples, the memory 148 or 152 can be used by software or applications running on the electrosurgical generator 104 or the control circuit 134 to store various program instructions for execution by the processor 150, such as to implement any of, but not limited to, the functions or operations of the electrosurgical system 100 described above. In some examples, the memory 148 or 152 can be described as computer-readable storage media. In some examples, a computer-readable storage media can include a non-transitory media. The term "non-transitory" can indicate that the storage media is not embodied in a carrier wave or a propagated signal. In some examples, a non-transitory storage media can store data that can, over time, change (e.g., in RAM or cache). In some examples, the memory 148 or 152 can be a temporary memory, such as meaning that a primary purpose of the memory 148 or 152 is not a long-term storage.

In some examples, the memory 148 or 152 can be described as volatile memory, meaning that the memory 148 or 152 does not maintain stored contents when power to the electrosurgical system 100 is turned off. Examples of volatile memories can include random access memories (RAM), dynamic random-access memories (DRAM), static random-access memories (SRAM), and other forms of volatile memories. In some examples, the memory 148 or 152 can include one or more computer-readable storage media. In some examples, the memory 148 or 152 can be configured to store larger amounts of information than volatile memory. In some examples, the memory 148 or 152 can further be configured for long-term storage of information. In some examples, the memory 148 or 152 can include non-volatile storage elements. Examples of such non-volatile storage elements can include magnetic hard discs, optical discs, flash memories, or forms of electrically programmable memories (EPROM) or electrically erasable and programmable (EEPROM) memories.

Figure 3:
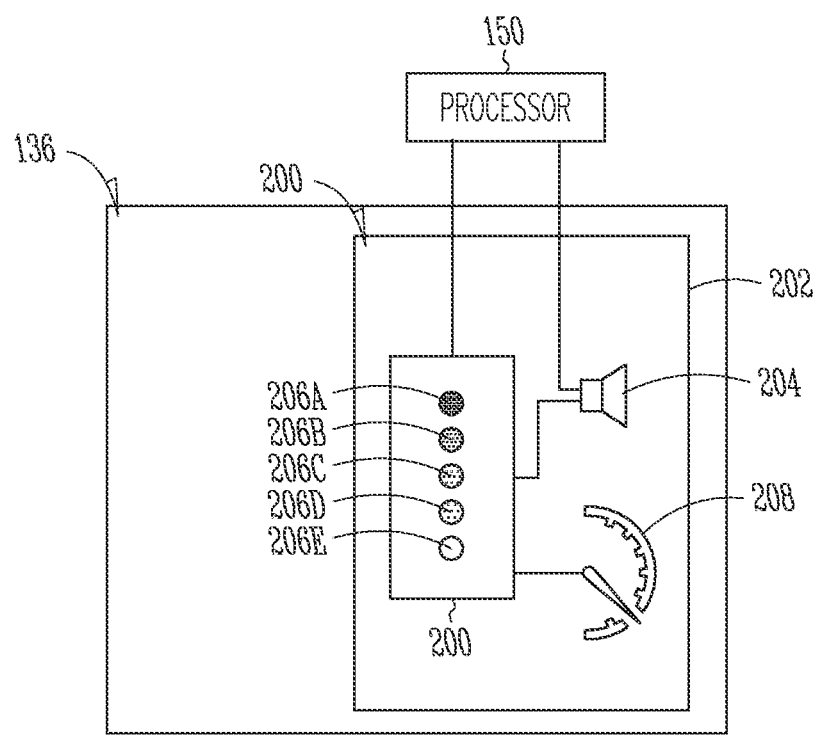
FIG. 3 illustrates a schematic view of an example output device of an electrosurgical generator.

FIG. 3 illustrates a schematic view of an example output device 200 of an electrosurgical generator 104 of an electrosurgical system 100. FIG. 3 is discussed with reference to the electrosurgical system 100 shown in, and described above with regard to, FIGS. 1-2. In some examples, the user interface 136 of the electrosurgical generator 104 can include at least the output device 200. The output device 200 can include a visual display 202 and an audio driver 204. The visual display 202 can be an active output display unit, such as a liquid crystal display, a plasma screen, an organic light-emitting diode display, or the like. The visual display 202 can also be both an input and output display unit, such as a touchscreen device to enable inputs, such as in response to various outputs.

The visual display 202 can be programmed to generate or otherwise provide various outputs to a user. In some examples, the visual display 202 can include output indicia 206A-206E and a dial 208. The visual display 202, the dial 208, or other output devices, can provide various types of feedback in response to any factors or parameters related to the functions or operations of the electrosurgical system 100 described above (FIGS. 1-2). For example, the output indicia 206A-206E can be any of various types of light emitters. In some examples, activation of at least one of the indicia 206A-206E can provide a user with an indication of a predetermined limit of the electrosurgical instrument 108. In some examples, such as upon connection or engagement of an electrosurgical device 106 to the electrosurgical generator 104, a light emitter 206E at the bottom of the output device 200, a light emitter 206A at the top of the output device 200, and any of the light emitters 204B-204D therebetween, can be activated (e.g., lit up) in an opposite manner, such as to visually illustrate to a user a remaining effective life, such as quantified as an aggregate number of remaining power source activations, before the predetermined limit of the electrosurgical instrument 108 will be exceeded.

In some examples, such as during intraprocedural use of the electrosurgical device 106, the light emitters 204A-206E can be sequentially activated to illustrate to a user the remaining effective life of the electrosurgical instrument 108 in real time. For example, the light emitter 206A or 206E can be activated to indicate the electrosurgical instrument 108 has received about, but not limited to, between 0-50 power source activations (e.g., electrical energy outputs) from the power source 144. In such an example, the remaining light emitters can be sequentially activated to indicate to a user that electrosurgical instrument 108 has received between about 51-100 (206B or 206D), 101-150 (206C), 151-200 (206D or 206B), or 200-250 (206E or 206A) power source activations. In some examples, the final light emitter (206E or 206A) to be activated to light up in a different manner, such as by blinking or flashing to indicate to a user that the predetermined limit of the electrosurgical instrument 108 will soon be, or has been, exceeded.

In some examples, all of light emitters 206A-206E can be activated to indicate a maximum life, or starting life, of the electrosurgical instrument 108, or to indicate that the effective life (e.g., predetermined limit) of the electrosurgical instrument 108 has been exceeded. In still further examples, any of the light emitters 206A-206E can light up in various different manners, such as by changing color, or by blinking or flashing, to indicate a precise or approximate number of power source activations. For example, if the light emitter 206A is lit up to indicate that the electrosurgical instrument 108 has received between about 50-100 power source activations, a change in color, or blinking or flashing, of the light emitter 206A can indicate to a user that the electrosurgical instrument has received between about 60, 70, 80, or 90 power source activations.

In some examples, the dial 208 can include a scale or other sequential markings configured to indicate to a user a remaining effective life of the electrosurgical instrument 108. In such examples, a needle of the dial 208 can move in a linear fashion between the sequential markings, such as to indicate that the electrosurgical instrument 108 has received between about, but not limited to, 51-100, 101-150, 151-200, or 200-250 power source activations. In some examples, movement of the needle of the dial 208 can be a function of, or can otherwise be linked to, the activation of the light emitters 206A-206E. In such an example, the dial 208 can be configured to function as a sub-dial, such as to indicate a precise or approximate number of power source activations, when viewed together with the light emitters 206A-206E.

For example, if the light emitter 206A is lit up to indicate that the electrosurgical instrument 108 has received between 50-100 power source activations, a position of the needle can indicate to a user that the electrosurgical instrument has received between about 60, 70, 80, or 90 power source activations. The user interface 136 can thereby provide a user with a visual alert corresponding to a remaining effective life of the electrosurgical instrument 108, or a visual alert indicating that the effective life (e.g., predetermined limit) of the electrosurgical instrument 108 has been exceeded.

In some examples, the audio driver 204 can be activated to generate and output an audible alert or alarm. In some examples, the audio driver 204 can be activated to function in a manner similar to the functions of the light emitters 206A-206E, or the needle of the dial 208 described above, such as to an audible indication of the remaining effective life of the electrosurgical instrument 108 before the predetermined limit of the electrosurgical instrument 108 will be exceeded. For example, a steady audio signal can be emitted via the audio driver 204 that changes pitch, volume or tone based on the number of power source activations (e.g., electrical energy outputs) that the electrosurgical instrument 108 has received from the electrosurgical generator 104.

In other examples, or an intermittent or periodic audio signal can be emitted that changes frequency, pitch, volume, or tone based on the number of power source activations that the electrosurgical instrument 108 has received from the electrosurgical generator 104. In still further examples, an audio signal generated and output by the audio driver 204 in response to the predetermined limit of the electrosurgical instrument 108 being exceeded by a user can be different from any other audio signal generated and output by the audio driver 204. In some examples, the audio driver 204 can be linked to the light emitters 206A-206E or the dial 208 to emit an audio signal in response to any function of the light emitters 206A-206E or the dial 208. The user interface 136 can thereby provide a user with an audible alert corresponding to a remaining effective life of the electrosurgical instrument 108, or an audible alert indicating that the effective life (e.g., predetermined limit) of the electrosurgical instrument has been exceeded. Although FIG. 3 is described above with reference to a predetermined limit defined by an aggregate number activations of the power source 144, the various elements or operations shown in and described with regard to FIG. 3 can also be used to provide indications of other predetermined limits, such as the maximum active time period of the electrosurgical instrument 108, or the any of the example effective time windows, described with regard to FIG. 2 above.

Figure 4:
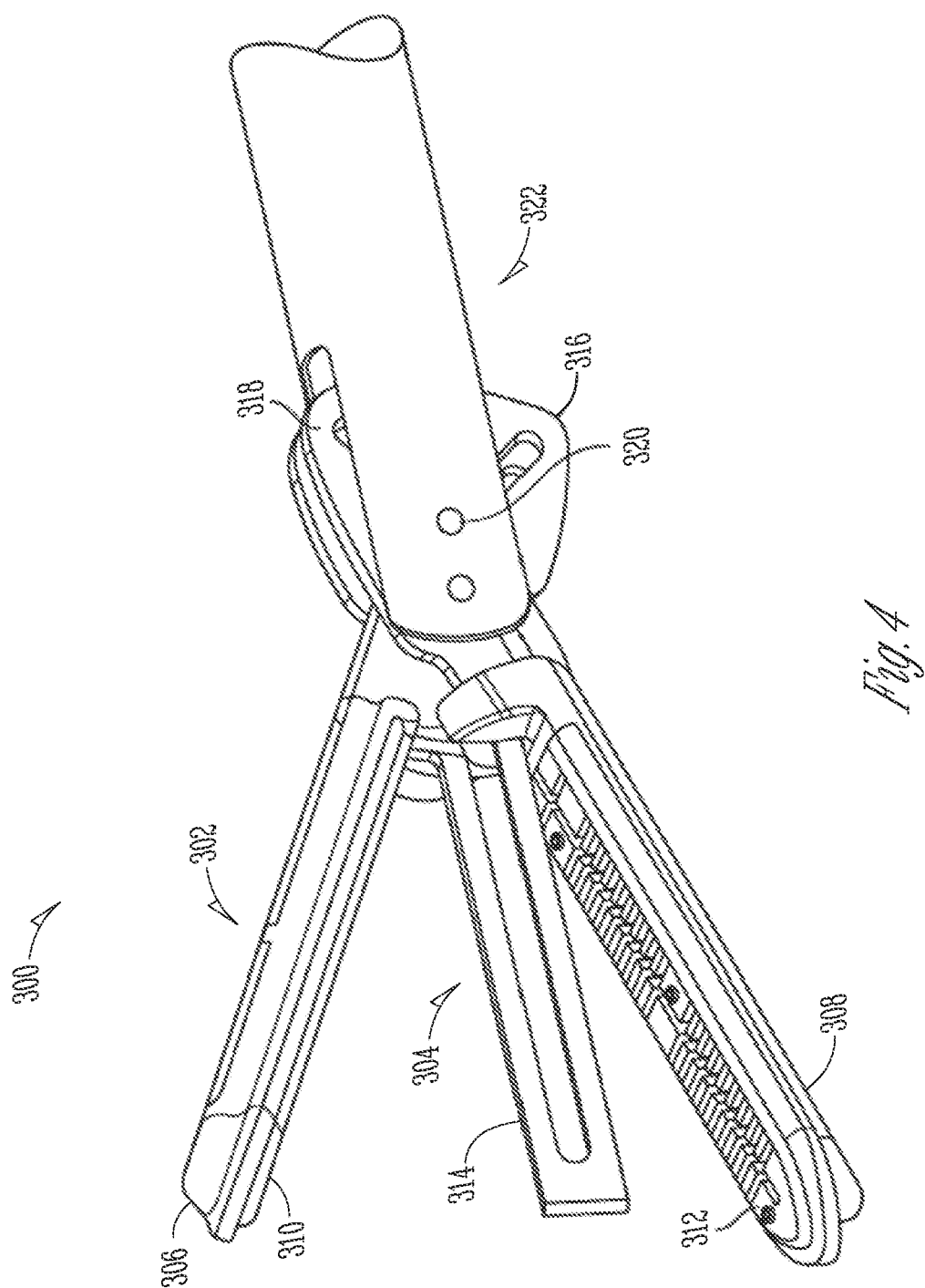
FIG. 4 illustrates an example electrosurgical instrument including surgical jaws with a hydrophobic layer deposited thereon.

FIGS. 4-7 illustrate various exemplary electrosurgical instruments 300-600 on which a hydrophobic layer can be deposited. FIGS. 4-7 are discussed with reference to various elements of the electrosurgical system 100 shown in, and described above with regard to, FIGS. 1-2. The hydrophobic layer can be similar to the hydrophobic layer 140 or to further examples of hydrophobic layers or hydrophobic physical structures shown in and discussed with regard to FIGS. 8-10 below. FIG. 4 illustrates an example electrosurgical instrument 300 including surgical jaws 302 with a hydrophobic layer 304 deposited thereon. The electrosurgical instrument 300 can be a vessel sealing forceps, such as usable to cut the biological tissue 102 with a mechanical cutting device assisted with RF (radio frequency) energy derived from the electrical energy produced by the electrosurgical generator 104.

The electrosurgical instrument 300 can include a hydrophobic layer 304. The surgical jaws 302 can include a first jaw 306, a second jaw 308, a first electrode plate 310, a second electrode plate 312, and a cutting element 314, a first flange 316, a second flange 318, a pivot point 320, and a channel 322. In the electrosurgical instrument 300, the first jaw 306 and the second jaw 308 can be hinged opposite each other and actuatable via one or more controls on the handpiece 114, such as the handle 118. A user can thereby open and close the surgical jaws 302 as desired during an electrosurgical procedure. The first electrode plate 310 and the second electrode plate 312 can be located on either of the first jaw 306 or the second jaw 308 to allow application of electrical energy from the electrosurgical generator 104 to the biological tissue 102, such as for use in vessel sealing. For example, during operation, a user can close the surgical jaws 302 around the biological tissue 102 and activate current flow, for example, to the first electrode plate 310 and the second electrode plate 312 such as by actuating the energy button 124, to seal the biological tissue 102.

The first 310 and the second 312 electrode plates can include a bipolar or monopolar electrode and optionally a blade, such as for use in cutting tissue. Bipolar or monopolar electrodes can make use of high frequency electrical current such as to cut, coagulate, desiccate, or fulgurate tissue. With a bipolar electrode configuration, current can pass through the biological tissue 102 tissue between two more closely-spaced electrodes, such as between the first 310 and the second 312 electrode plates. In a bipolar configuration, the current passes through the tissue between tips of two active electrodes, such as between tips of the first 310 and the second 312 electrode plates. With a monopolar configuration, current can pass through the biological tissue 102 between the electrosurgical instrument 108 and a pad on a patient's abdomen or another other, separate return electrode.

The first jaw 306 and the second jaw 308 can be articulated through movement of the first flange 316 and the second flange 318, respectively, around the pivot point 320. The cutting element 314 can be configured to move in and out of the channel 322, such as located in the body of the distal portion 130 of the shaft assembly 116. When surgical jaws 302 have been used to seal tissue, a user can extend the cutting element 314 outward between the surgical jaws, such as by actuating the cutting trigger 122. The cutting element 314 can thereby extend through the channel 322 and cut the biological tissue 102. The hydrophobic layer 304 can be deposited on and around at least a portion of the cutting element 314. In some cases, the hydrophobic layer 304 can be deposited in and around the channel 322 to prevent tissue build-up in the channel 322 when the cutting element 314 is moved in and out of the channel 322.

Figure 5:
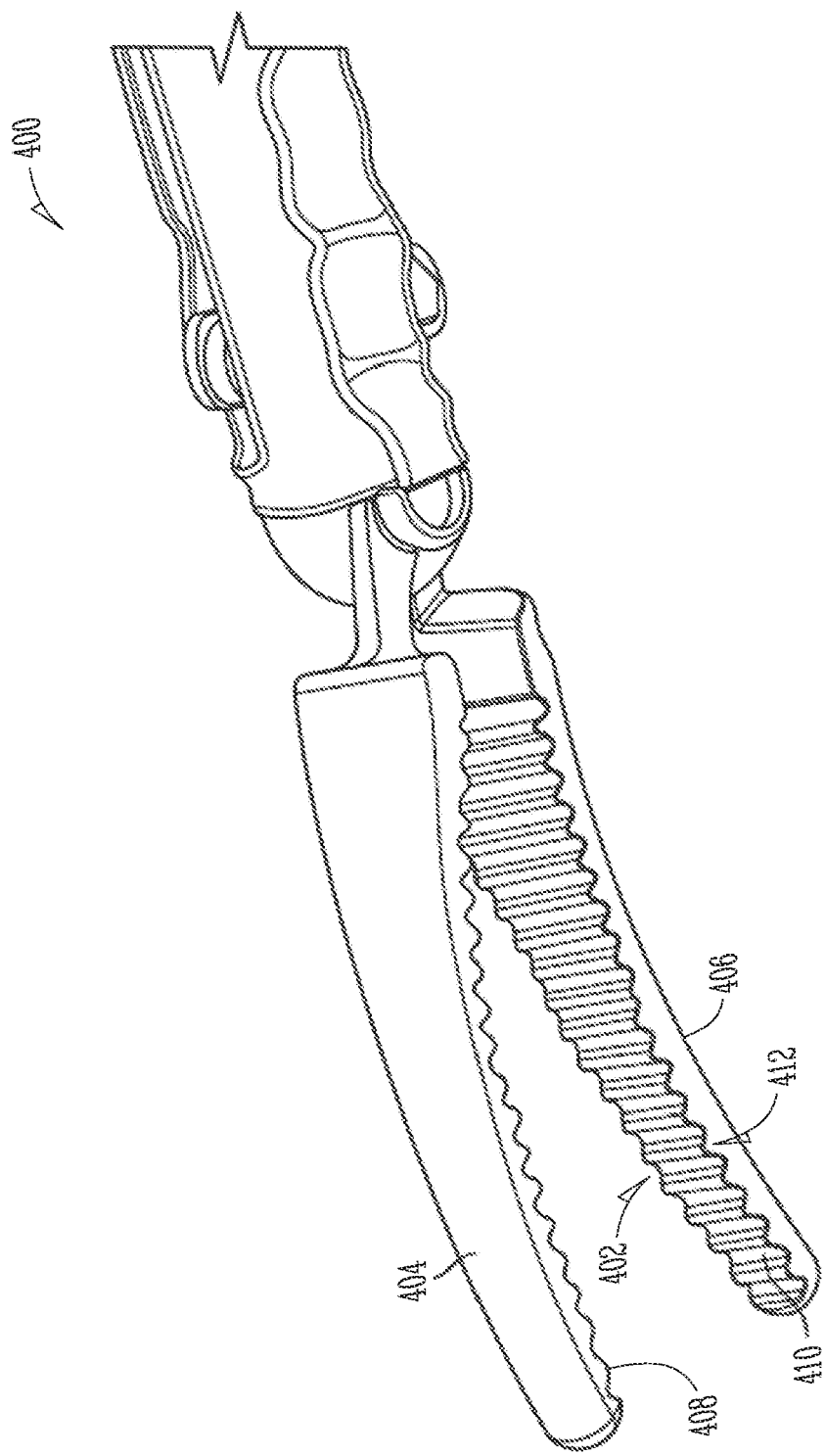
FIG. 5 illustrates an example electrosurgical dissecting forceps with a hydrophobic layer deposited thereon.

FIG. 5 illustrates an example electrosurgical forceps 400 with a hydrophobic layer 402 deposited thereon. The electrosurgical forceps 400 can be similar to the electrosurgical instrument 300 discussed above; but can be used for dissection of tissue. The electrosurgical forceps 400 can include a first jaw 404, a second jaw 406, a first electrode plate 408, and a second electrode plate 410. In an example, portions of the first jaw 404 and the second jaw 406 can act as a cutting element 412, such as in place of a standalone blade or knife assembly. For example, the first jaw 404 and the second jaw 406 can be serrated to allow for these actions.

In an example, the electrosurgical forceps 400 can include a cutting element located between the first jaw 404 and the second jaw 406, such as the cutting element 314 shown in FIG. 4. The first jaw 404 and the second jaw 406 can also be curved to allow for articulation and secure grasping dissecting, retracting, and coagulating of the biological tissue 102. The first electrode plate 408 and the second electrode plate 410 can be fully or partially coated with the hydrophobic layer 402.

Figure 6:
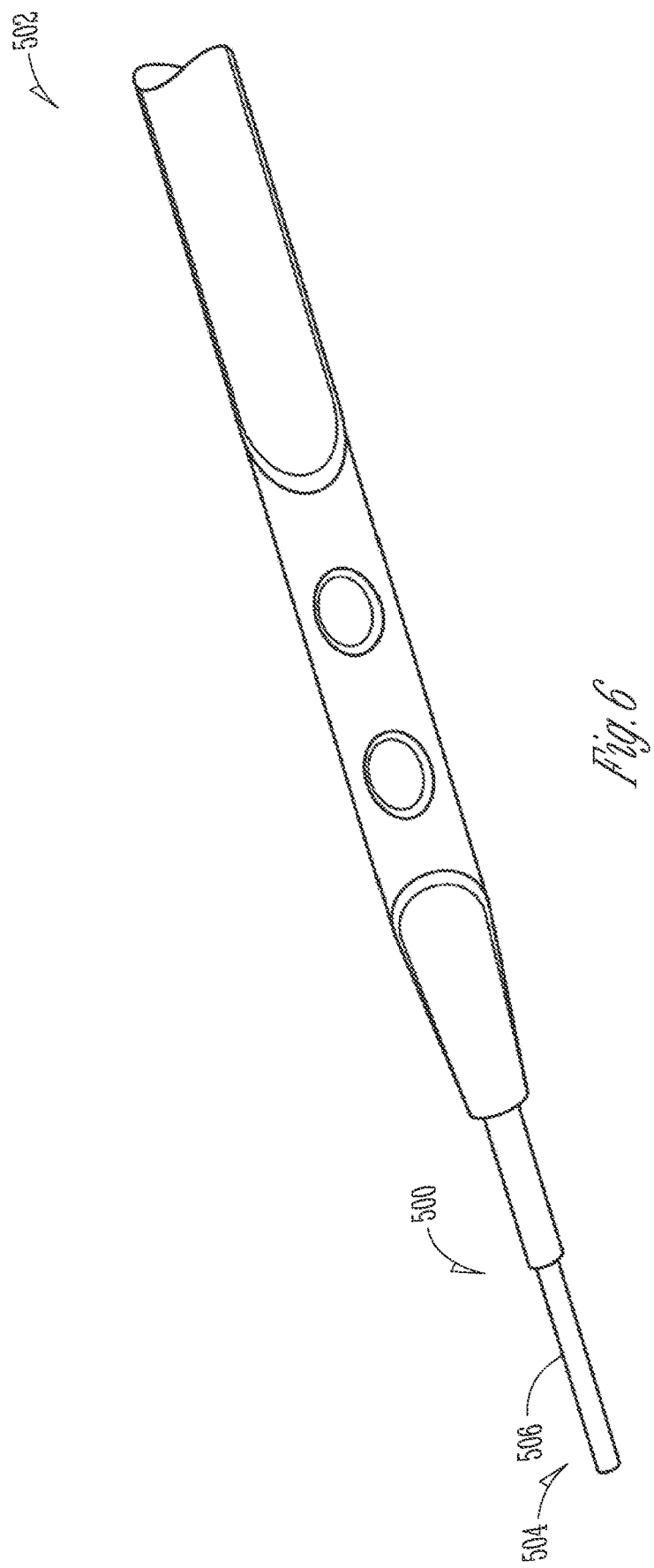
FIG. 6 illustrates an example of an electrosurgical pencil with a hydrophobic layer deposited thereon.

FIG. 6 illustrates an example of a distal portion 502 electrosurgical pencil 500 with a hydrophobic layer 504 deposited thereon. The electrosurgical pencil 500 can include a cutting element 506. In such an example, the electrosurgical pencil 500 itself can function as a cutting element 506 in various electrosurgical procedures; and can be at least partially coated by the hydrophobic layer 504. The electrosurgical pencil 500 can be used for precise surgical techniques as desired. Alternatively, the hydrophobic layer 504 can be deposited on a cutting portion of an electrosurgical spatula.

Figure 7:
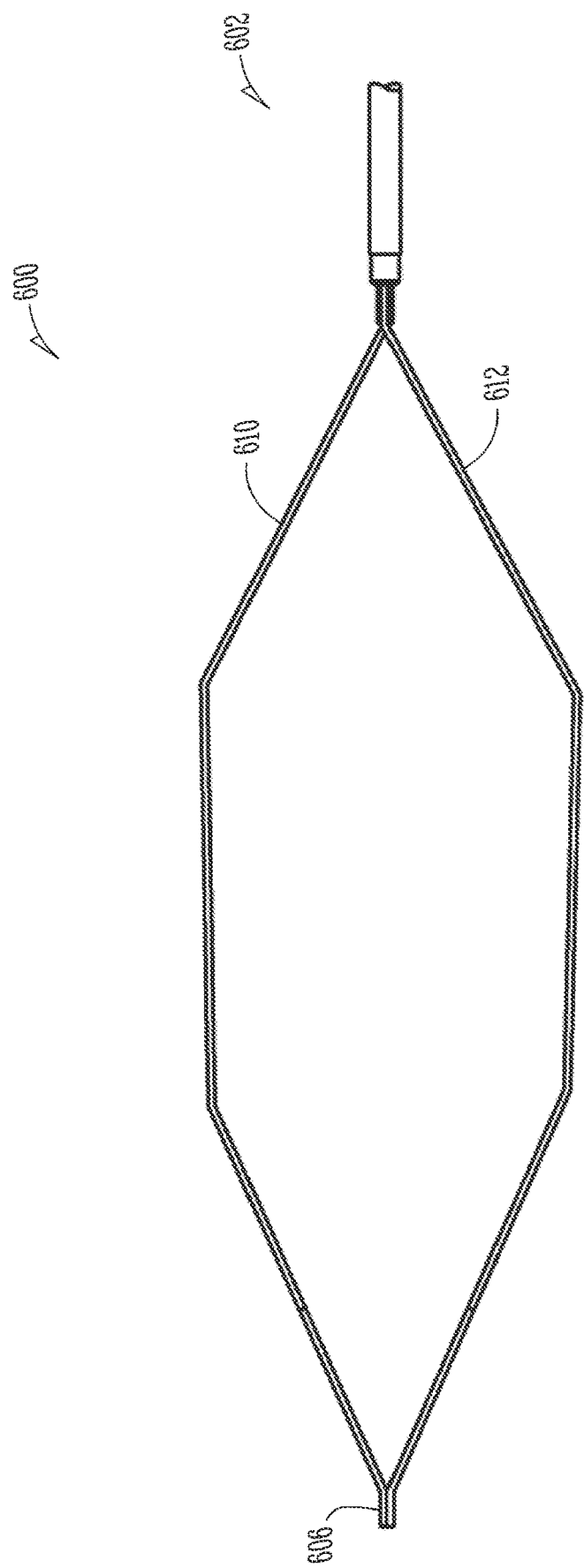
FIG. 7 illustrates an example of a distal portion of an electrosurgical laparoscopic loop with hydrophobic layer deposited thereon.

FIG. 7 illustrates a distal portion 602 of a laparoscopic loop 600 with a hydrophobic layer 604 deposited thereon. The laparoscopic loop 600 can include a cutting element 606 and loop sections 610 and 612, which can together meet at the cutting element 606. The cutting element 606 can be at least partially covered by the hydrophobic layer 604. The laparoscopic loop 600 can be coupled to the electrosurgical generator 104 to provide bipolar energy to the biological tissue 102, such as for use in supracervical hysterectomy procedures.

Figure 8:
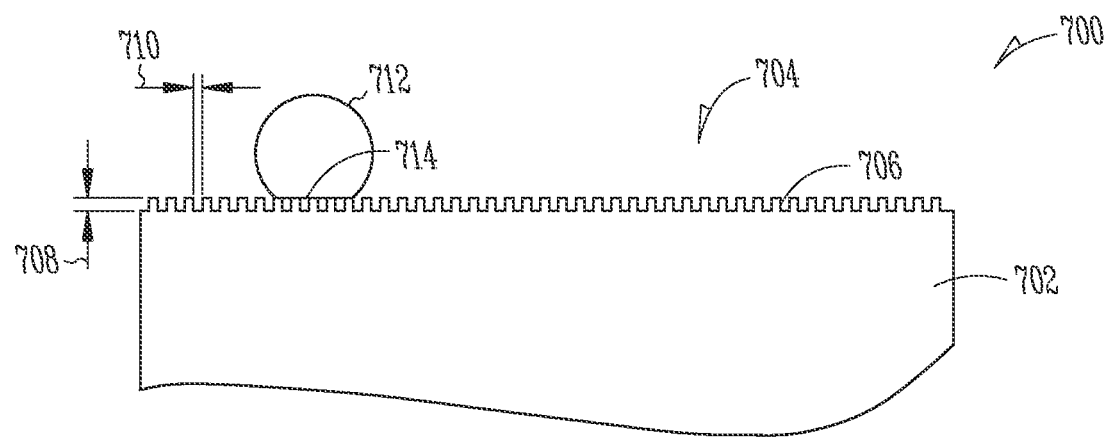
FIGS. 8-9 show schematic diagrams of example hydrophobic layers deposited on a surface of an electrosurgical device.
Figure 9:
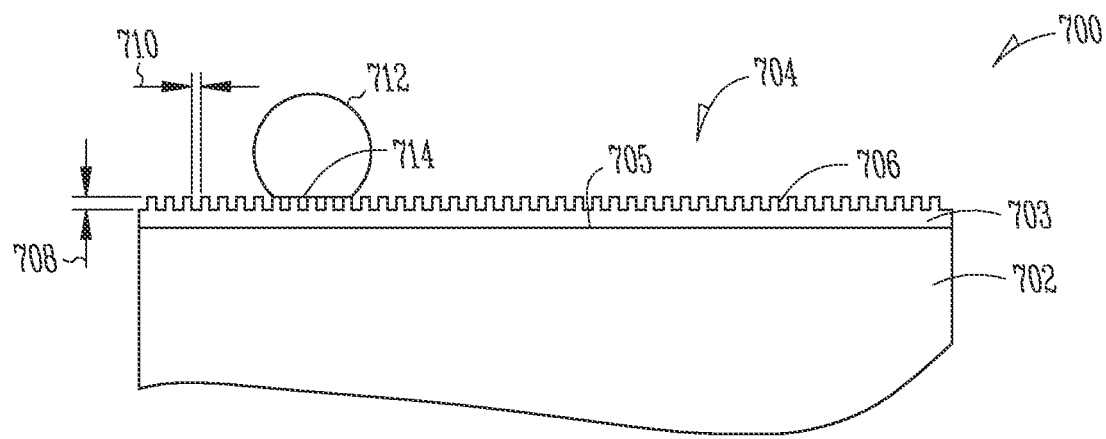

FIGS. 8-9 show schematic diagrams of example hydrophobic layers 700 deposited on a surface 702 of an electrosurgical device. FIGS. 8-9 are discussed below concurrently. For example, the hydrophobic layer 700 can form a hydrophobic physical structure 704 on the surface 702. The hydrophobic layer 700 can be similar to any of the hydrophobic layers, and the surface 702 can be any surface of any of the components of the various electrosurgical devices or instruments shown in, and discussed above with regard to, FIGS. 1-7. In general, a thickness or depth of the hydrophobic layer 700 can be in the range of about 10 nm to about 300 nm to provide non-stick functionality and associated benefits. As discussed in the examples below, various portions of this range can provide specific or additional benefits while concurrently providing tissue adhesion resistance and sensing capability.

In some examples, the hydrophobic layer 700 can be a thin coating, such having a thickness in the range of about, but not limited to, 10-30 nanometers. In some examples, the hydrophobic layer 700 can have a thickness in the range of about 10-20 nanometers. In another example, the hydrophobic layer 700 can have a thickness less than 20 nanometers, such as about 15 nanometers. In some examples, the thickness of the hydrophobic layer 700 can define or otherwise dictate the predetermined limit of the electrosurgical instrument 108 or the electrosurgical device 106. For example, increasing the thickness of the hydrophobic layer can increase the maximum number of power source 144 (FIG. 2) activations that the hydrophobic layer 700 can receive, or the increase the maximum active time period of the hydrophobic layer 700, before it no longer effectively functions to reduce the surface adhesion of the surface to which it was applied or deposited on. In some examples, a hydrophobic layer 700 having a thickness of about, but not limited to, 5-10 nanometers, 11-15 nanometers, 16-20 nanometers, 21-25 nanometers, or 26-30 nanometers, can receive between about, but not limited, 100-200, 201-300, 301-400, or 401-500 power source activations, respectively, before failing to effectively reduce surface adhesion.

In some examples, a hydrophobic layer 700 having a thickness of about, but not limited to, 5-10, 11-15, 16-20, 21-25, or 26-30 nanometers, can be subject to a maximum active time period of about, but not limited to, 30-60 minutes, 61-120 minutes, 121-180 minutes, 181-240 minutes, or 240 to 300 minutes. Any number of activations, or any active time period, may be used depending on the characteristics of the device to define the predetermined limit. Depending on the characteristics of the device, some ranges or thresholds may be preferable. In addition, combinations of ranges/thresholds of activations and active time periods can be used to define the predetermined limit. In any example limit described in this document above, the hydrophobic layer 700, or other coatings, can change (e.g., degrades, deteriorates, erodes) from a first state to a second state. For example, in the first state, the hydrophobic layer 700 can have a thickness sufficient to reduce the surface adhesion between at least a portion of the electrosurgical instrument 108 (FIGS. 1-4) or the electrosurgical device 106 (FIGS. 1-4) and the biological tissue 102 (FIG. 1). In the second state, the hydrophobic layer 700, or a portion thereof, can be eroded to a thickness insufficient to reduce the surface adhesion between at least a portion of the electrosurgical instrument 108 or the electrosurgical device 106 and the biological tissue 102. For example, the second state can be defined as a predetermined percentage of a starting thickness of the hydrophobic layer 700, or other coatings, such as, but not limited to, about 25-40, 41-55, 56-70, 71-85, or 86-100 percent of the starting thickness.

In other examples, the material used for the hydrophobic layer 700 can affect the maximum number of power source activations that the hydrophobic layer 700 can receive. The hydrophobic layer 700 can be configured to allow passage of electrical energy through, such that an electrosurgical instrument can transfer or otherwise apply the electrical energy to biological tissue. For example, the hydrophobic layer 700 can be a light capacitive element or light resistive element configured to allow passage of electrode energy through the hydrophobic layer 700. In such an example, the hydrophobic layer 700 can be directly applied to the surface 702 such as to a cutting element of an electrosurgical device, and to an electrode, such as any electrode plates of an electrosurgical instrument coupled to or otherwise including in the electrosurgical device. In some cases, an adhesive can be used to apply the hydrophobic layer 700 to the surface 702 of an electrosurgical device.

In some examples, the hydrophobic layer 700 can include a polymeric-based coating, such as a fluoropolymer type coating. In some examples, the hydrophobic layer 700 can include a Polytetrafluoroethylene (PTFE) coating. In some examples, the hydrophobic layer 700 can include a polysiloxane or a fluorosilane coating. In such an example, materials such as silicone and silicone resins can be used. In some examples, the silicone and silicone resins can be applied using a plasma deposition process to precisely control the thickness and withstand the heat generated during, for example, tissue or vessel sealing. Silicone resins suitable for the hydrophobic layer 700 can include, but are not limited to, polydimethyl siloxanes, polyester-modified methylphenyl polysiloxanes, such as polymethylsilane and polymethylsiloxane, and hydroxyl functional silicone resins.

In some examples, the hydrophobic layer 700 can be made from a composition including a siloxane, which can include hexamethyldisiloxane, hexadimethylsiloxane, tetramethylsilane, hexamethyldisilazane, or any combination thereof. In some examples, the hydrophobic layer 700 can be a polydimethylsiloxane ("PMDSO") coating. In some examples, the hydrophobic layer 700 can be a hexamethyldisiloxane ("HMDSO") coating. In some examples, the hydrophobic layer 700 can be a tetramethyldisiloxane (TMDSO or TMDS). In still further examples, the hydrophobic layer 700 can include a thin layer of hexamethyldisiloxane (HMDSO), such as having a thickness of about 1-5 nanometers. In general, HMDSO is electrically resistive, however, the thinness of such a layer can allow the passage of electrical energy therethrough.

In some examples, the hydrophobic layer 700 can include an etched coating, such as including one or more hydrophobic pillars superimposed onto an electrode plate of an electrosurgical instrument. In such an example, a nanostructure of the hydrophobic pillars can act as a superhydrophobic coating having a low surface energy to reduce tissue adhesion or stiction. Such an etched coating can be formed in any suitable pattern for the hydrophobic layer 700 to reduce or prevent tissue adhesion, and can be applied, for example, by printing, chemical etching, laser etching, chemical bombardment, or other techniques. Various example materials of the hydrophobic layer 700 are discussed above, however, any material capable of providing the desired functionality (e.g., reduction of surface 702 adhesion while concurrently maintaining effective electrical transmission therethrough, such as to permit tissue or vessel sealing) can be used as the hydrophobic layer 700, if the material has adequate biocompatibility. In an example, such a material can be porous to allow or otherwise improve electrical transmission through the material.

The hydrophobic layer 700 can define a hydrophobic physical structure 704 deposited on all, or only a portion of any of surface on an electrosurgical device or instrument. The hydrophobic layer 700 can define different hydrophobic physical structures, such as for use on specific or different surfaces or components of an electrosurgical device or instrument. For example, the hydrophobic later 700 can define the hydrophobic physical structure 704 on only a specific portion or area an electrosurgical instrument; or can define a different hydrophobic physical structure on other portions. In an example, the hydrophobic physical structure 704 can be deposited on any insulation elements on or around a cutting element of an electrosurgical instrument, but not on a cutting edge or other cutting means of the cutting element.

The hydrophobic physical structure 704 can include asperities 706. The asperities 706 can define a height 708 and a pitch 710. In some examples, the hydrophobic physical structure 704 can be described or otherwise defined by the equation below.

$$\Lambda_C = \frac{-\rho g V^{1/3}\left(\left(\frac{1-\cos(\theta_a)}{\sin(\theta_a)}\right)\left(3+\left(\frac{1-\cos(\theta_a)}{\sin(\theta_a)}\right)^2\right)\right)^{2/3}}{(36\pi)^{1/3}\gamma\cos(\theta_{a,0}+w-90)}$$

In such an example, $\Lambda$ is a contact line density and $\Lambda_c$ is a critical contact line density; $\rho$=density of the liquid droplet; g=acceleration due to gravity; V=volume of the liquid droplet; $\theta_a$=advancing apparent contact angle; $\theta_{a,0}$=advancing contact angle of a smooth substrate; $\gamma$=surface tension of the liquid; and w=tower wall angle. The contact line density $\Lambda$ is defined as a total perimeter of asperities over a given unit area. In an example, if $\Lambda>\Lambda_c$ then a droplet 712 of liquid can be suspended in a Cassie-Baxter state. Otherwise, the droplet 712 will collapse into a Wenzel state. In an example, the droplet 712 is in a Cassie-Baxter state and an ultra-hydrophobic condition exists, such as forming or defining a low-adhesion surface.

With regard to FIG. 8, the droplet 712 rests on top of the asperities 706 at interface 714 in a Cassie-Baxter state. Although the asperities 706 are shown in the shape of rectangles for illustration purposes, the invention is not so limited. For example, a shape formed by each of the asperities 706 is taken into account in the formula above, at least via tower wall angle (e.g., "w"). With regard to FIG. 9, the asperities 706 are formed directly from a bulk material and are not formed from a separate coating. In an example, a method of forming the asperities 706 directly from a bulk material includes chemical etching. In an example, a method of forming the asperities 706 directly from a bulk material includes laser etching or ablation. In another example, a method of forming the asperities 706 directly from a bulk material includes ion etching.

Further, as illustrated in FIG. 9, the hydrophobic physical structure 704 can be part of a coating 703 that forms or otherwise defines a direct interface 705 with the surface 702. The asperities 706 can formed by application of nanoparticles to the surface 702 to form the coating 703. In some examples, the asperities 706 can be formed by application of nanoparticles to a surface of the coating 703. In some examples, the nanoparticles can include hexamethyldisiloxane (HMDSO) particles. In some examples, the nanoparticles can include tetramethyldisiloxane (TMDSO) particles. In still further examples, the nanoparticles can include fluorosilane particles. The above examples describe various nanoparticle materials, however other nanoparticle materials are within the scope of the invention. In an additional example, a hydrophobic chemistry of a nanoparticle, in combination with a nano-scale asperity structure, such as shown in FIG. 9, can provide better hydrophobicity relative to a hydrophobic chemistry alone.

Figure 10:
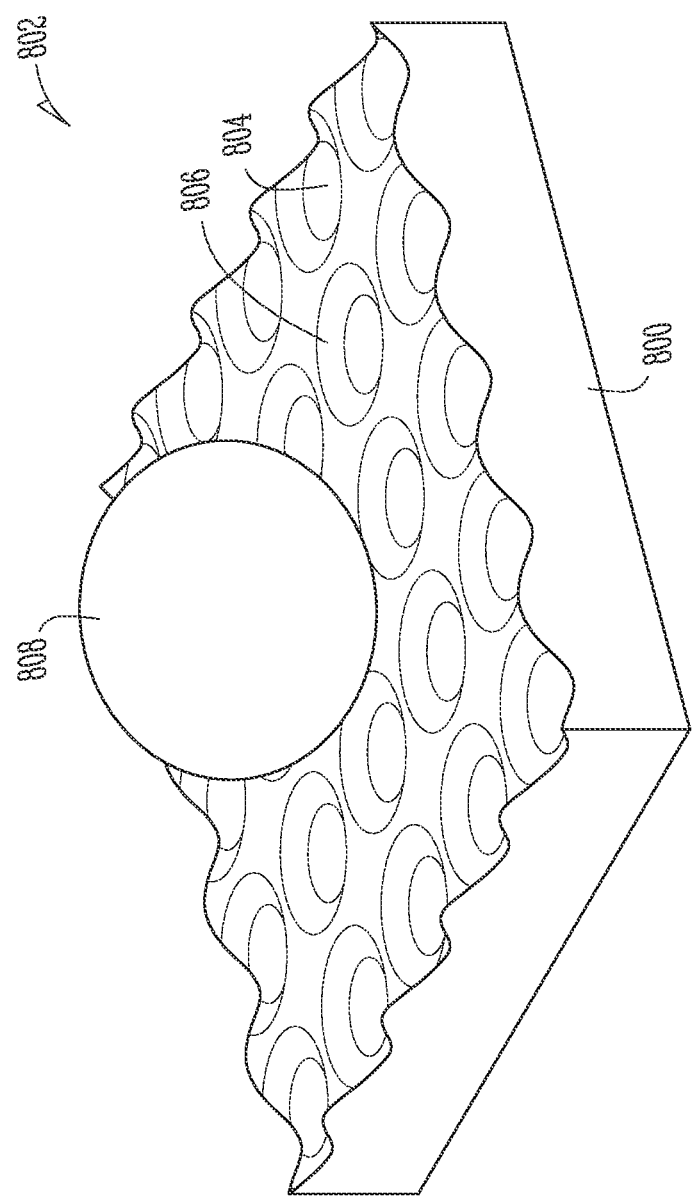
FIG. 10 illustrates an example of a laser etched surface with a hydrophobic physical structure formed thereon.

FIG. 10 illustrates an example of a laser-etched surface 800 with a hydrophobic physical structure 802 formed thereon. The hydrophobic physical structure 802 can be similar to the hydrophobic layer 700, such as including the hydrophobic physical structure 704 shown in, and discussed above with regard to, FIGS. 8-9. The laser-etched surface 800 can be any surface of any of the components of the various electrosurgical devices or instruments shown in, and discussed above with regard to, FIGS. 1-9.

The application of the hydrophobic physical structure 802 can be accomplished using any system and process capable of precisely controlling the thickness of the coating. In some examples, HMDSO is deposited on electrically conductive sealing plates, such as the electrode plates of various electrosurgical instruments using plasma enhanced chemical vapor deposition (PECVD) or other suitable methods such as atmospheric pressure plasma enhanced chemical vapor deposition (AP-PECVD). In such examples, the application of the polydimethylsiloxane coating can be accomplished using a system and process that includes a plasma device coupled to a power source, a source of liquid and/or gas ionizable media (e.g., oxygen), a pump, and a vacuum chamber.

The power source can include any suitable components for delivering power or matching impedance to the plasma device. For example, the power source can be a radio frequency generator or other power source capable of producing electrical power to ignite and sustain the ionizable media to generate a plasma effluent. As illustrated in FIG. 10, a gaussian hole array can be formed by applying laser energy to the laser-etched surface 800 of an electrosurgical instrument in a controlled regular pattern, such as to form a plurality of holes 804. The shape of each of the holes 804 can be characterized as gaussian due to the energy distribution of the laser energy used in forming the array. In such a process, a plurality of asperities 806 can also be formed, such as spaced and arranged in an array that provides a Cassie-Baxter state as described above with regard to FIGS. 8-9. An example liquid droplet 808 is also illustrated on the hydrophobic physical structure 802. The liquid droplet 808 can be similar any of the droplets 712 shown in, and discussed above with regard to, FIGS. 8-9.

Figure 11:
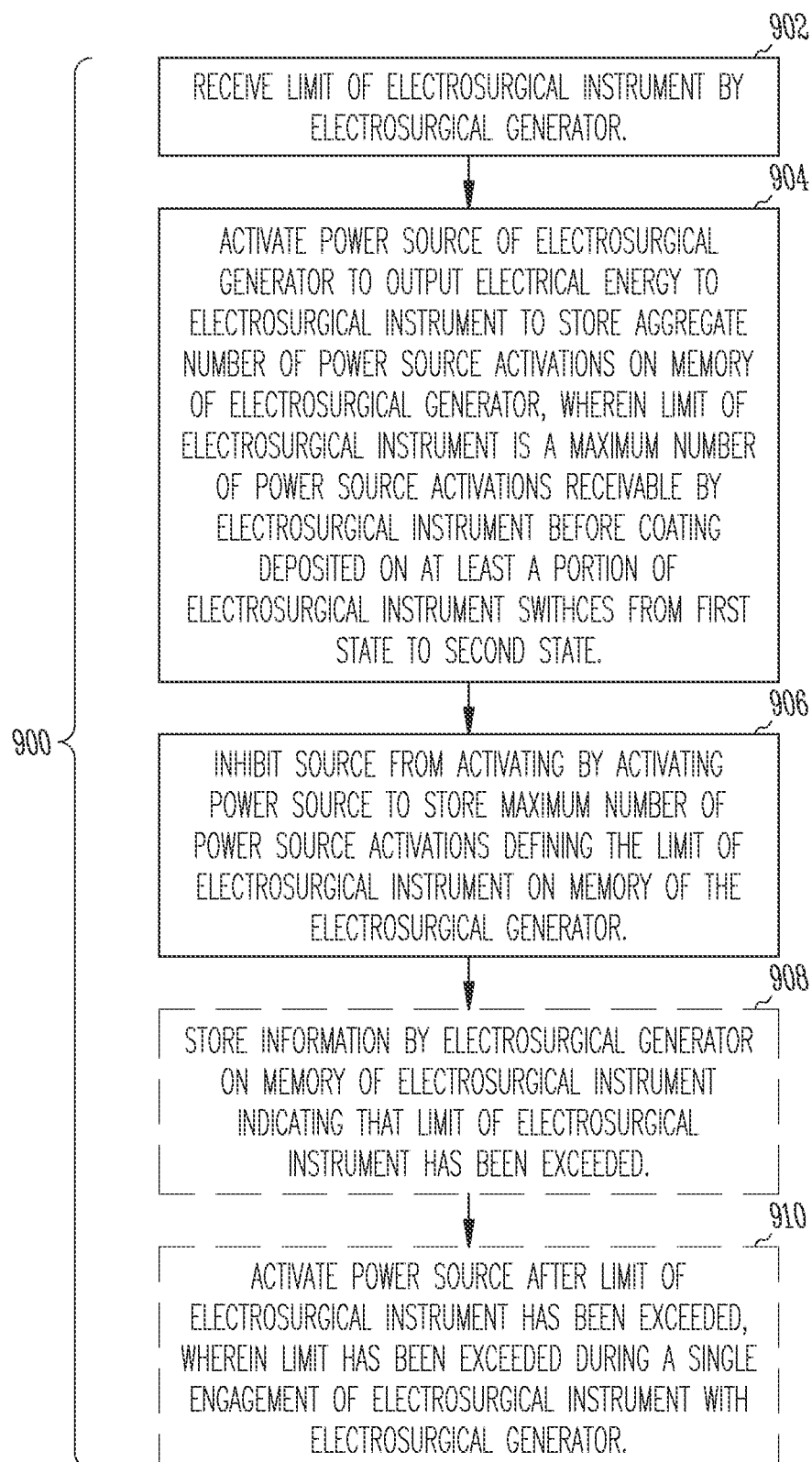
FIG. 11 illustrates a flow chart of an example method for preventing reuse of an electrosurgical instrument after a limit of the electrosurgical instrument has been exceeded.

FIG. 11 illustrates a flow chart of an example method 900 for inhibiting an electrosurgical generator from outputting electrical energy to an electrosurgical instrument after a limit of the electrosurgical instrument has been exceeded. The steps or operations of the method 900 are illustrated in a particular order for convenience and clarity. The discussed operations can be performed in parallel or in a different sequence without materially impacting other operations. The method 900 as discussed includes operations that can be performed by multiple different actors, devices, and/or systems. It is understood that subsets of the operations discussed in the method 900 can be attributable to a single actor device, or system, and could be considered a separate standalone process or method.

The method 900 can begin with operation 902. The operation 902 can include receiving a limit of the electrosurgical instrument by the electrosurgical generator. For example, a user can establish an electrical connection between the electrosurgical generator and the electrosurgical instrument using an electrical connector and/or network or wireless communication. Upon establishing such a connection, the electrosurgical generator can transfer data to, or receive data from, the electrosurgical instrument, and in response, the electrosurgical generator can indicate or otherwise provide a user with the limit (e.g., effective life) of the electrosurgical instrument. The operation 902 can optionally include wherein receiving the limit of the electrosurgical instrument by the electrosurgical generator includes exchanging information between the electrosurgical instrument and the electrosurgical generator via an electrical connector establishing electrical communication therebetween, such as including looking up the limit of the electrosurgical instrument in a memory or a database of the electrosurgical generator. For example, upon connection of the electrosurgical instrument to the electrosurgical generator, the electrosurgical generator can automatically match data stored on a memory of the electrosurgical instrument with an individual database entry (e.g., data set) located on a database of the electrosurgical generator, or on a database in network communication with the electrosurgical generator, to obtain a predetermined limit of the electrosurgical instrument.

Thus, the electrosurgical generator can read information from the electrosurgical instrument to recognize, for example, a maximum number of power source activations, or a maximum active time period, that the electrosurgical instrument can be subject to. Such an exchange of information can include generating an audible or a visual alert indicating the limit of the electrosurgical instrument. For example, the electrosurgical generator can include a user interface, which can include, for example, output devices such as a visual display, one or more dials, and an audio driver. In some examples, activation of at least one of the visual display, the one or more dials, and the audio driver can provide a user with an indication of a limit of the electrosurgical instrument. In some examples, the indication can be, or further include, an indication of a remaining life of the electrosurgical instrument such as a quantified amount of use remaining before the limit of the electrosurgical instrument will be exceeded.

The operation 902 can optionally include wherein the limit further includes an effective time window, and wherein connecting the electrosurgical instrument to the electrosurgical generator includes starting a timer to inhibit activation of the power source after the effective time window has been exceeded. For example, the effective time window can be a number of hours or minutes in which an electrosurgical procedure is to be completed, such as measured by a clock or timer of the electrosurgical generator and beginning after a first engagement or first connection of the electrosurgical instrument to, or beginning after a first disengagement or first disconnection from, the electrosurgical generator.

The operation 902 can optionally include wherein receiving the limit of the electrosurgical instrument by the electrosurgical generator includes exchanging information between an RFID or NFC transceiver of the electrosurgical generator and an RFID or NFC tag of the electrosurgical instrument. For example, the electrosurgical generator can include a radio frequency identification (RFID) or near-field communication (NFC) wireless transceiver; and the electrosurgical instrument can include an inlay or hard tag, such as including an antenna and a memory. In such an example, connecting the electrosurgical instrument to the electrosurgical generator can include providing power to the RFID or NFC tag, such as to enable wireless data transmission or reception between the RFID or NFC transceiver and the RFID or NFC tag.

The method 900 can include operation 904. The operation 904 can include activating a power source of the electrosurgical generator to output electrical energy to the electrosurgical instrument to store an aggregate number of power source activations on a memory of the electrosurgical generator, wherein the limit of the electrosurgical instrument is a maximum number of power source activations receivable by the electrosurgical instrument before a coating deposited on at least a portion of the electrosurgical instrument changes from a first state to a second state, wherein the coating comprises a material having a surface adherence to the tissue that is less than a surface adherence to the tissue of a material of the portion of the electrosurgical instrument.

For example, a user can engage biological tissue with one or more surfaces of the electrosurgical instrument, and can then operate an energy button, such as located on an electrosurgical device containing, or otherwise including, the electrosurgical instrument, to cause the power source of the electrosurgical generator to activate and output electrical energy to the electrosurgical instrument through the electrosurgical device. In some examples, a single actuation of the energy button can cause the power source to repeatedly activate to output cyclical, intermittent, or otherwise variable electrical energy, and can concurrently cause the electrosurgical generator to count, aggregate, and store the aggregate number of power source activations. In some examples, counting, aggregating, and storing the aggregate number of power source activations can include counting, aggregating, and storing a length (e.g., timespan) of each activation on a memory of the electrosurgical generator or electrosurgical instrument.

The operation 904 can optionally include wherein activating the power source of the electrosurgical generator includes generating an audible or a visual alert corresponding to a remaining number of power source activations before the limit of the electrosurgical instrument is exceeded. For example, the electrosurgical generator can include a user interface, which can include, for example, output devices such as a visual display, one or more dials, and an audio driver. In some examples, activation of at least one of the visual display, the one or more dials, and the audio driver can provide a user, in real time, with an indication of a remaining life of the electrosurgical instrument, such as a quantified amount of use remaining before the limit of the electrosurgical instrument will be exceeded. In some examples, activation of at least one of the visual display, the one or more dials, and the audio driver can provide a user with an indication that the electrosurgical instrument does not have any remaining life, such as when the limit of the electrosurgical device has been exceeded.

The operation 904 can optionally include wherein the limit further includes a maximum active time period, and wherein operating the electrosurgical instrument to repeatedly activate the power source includes starting a timer upon each activation of the power source and stopping the timer upon each deactivation of the power source to store an aggregate active time period on a memory of the electrosurgical generator. For example, a user can operate an energy button, such as located on an electrosurgical device containing or otherwise including the electrosurgical instrument, to cause a power source of the electrosurgical generator to activate and output electrical energy to the electrosurgical instrument through the electrosurgical device. In such an example, a single actuation of the energy button can cause the power source to repeatedly activate to output cyclical, intermittent, or otherwise variable electrical energy, and concurrently cause the electrosurgical generator to count, aggregate, and store a length (e.g., timespan) of each power source activation on a memory of the electrosurgical generator.

The method 900 can include operation 906. The operation 906 can include inhibiting the power source from activating by activating the power source to store the maximum number of power source activations defining the limit of the electrosurgical instrument on the memory of the electrosurgical generator. For example, a user can operate an energy button, such as located on an electrosurgical device containing, or otherwise including the electrosurgical instrument to cause the electrosurgical generator to active an aggregate number of times less than, equal to, or greater than a maximum number of power source activations defining the limit of the electrosurgical instrument. In such an example, the electrosurgical generator can then disable the power source, such as by inhibiting or otherwise preventing the electrosurgical instrument from effectively calling for activation via operation of the energy button, or inhibiting or otherwise preventing electrical energy generated upon activation of the power source from being output to the electrosurgical instrument, by interrupting signal communication between the electrosurgical device and the power source.

The operation 906 can optionally, or alternatively, include inhibiting output of electrical energy from the electrosurgical generator to the electrosurgical instrument by inhibiting the power source from activating by operating the electrosurgical instrument to store a maximum active time period defining the limit of the electrosurgical instrument on the memory of the electrosurgical generator. For example, a user can operate an energy button, such as located on an electrosurgical device containing, or otherwise including the electrosurgical instrument, to cause the electrosurgical generator to store an aggregate active time period less than, equal to, or greater than a maximum active time period defining the limit of the electrosurgical instrument on a memory of the electrosurgical generator. The electrosurgical generator can then disable the power source, such as discussed above.

The method 900 can optically include operation 908. The operation 908 can include storing information by the electrosurgical generator on a memory of the electrosurgical instrument indicating that the limit of the electrosurgical instrument has been exceeded. For example, a user can operate an energy button, such as located on an electrosurgical device containing, or otherwise including the electrosurgical instrument, to cause the electrosurgical generator to store an aggregate active time period equal to, or greater than a maximum active time period or maximum number of power source activations defining the limit of the electrosurgical instrument on a memory of the electrosurgical generator.

The method 900 can optionally include operation 910. The operation 910 can include activating the power source after the limit of the electrosurgical instrument has been exceeded, wherein the limit has been exceeded during a single engagement of the electrosurgical instrument with the electrosurgical generator. For example, the electrosurgical generator can be configured to enable one or more user inputs, such as operation of an energy button after the limit of the electrosurgical instrument has been exceeded, to cause the electrosurgical generator to output electrical energy to the electrosurgical instrument if any of various conditions are met, such as provided the electrosurgical instrument has not been disconnected from the electrosurgical generator between operations 902 and 908, or in additional examples, provided that an effective time window, such as beginning after connecting or disconnecting the electrosurgical instrument to or from the electrosurgical generator, or a maximum active time period of the electrosurgical instrument, has not been exceeded.

The operation 910 can optionally include disconnecting the electrosurgical instrument from the electrosurgical generator, wherein disconnecting the electrosurgical instrument includes inhibiting the electrosurgical generator from outputting electrical energy to the electrosurgical instrument after reconnecting the electrosurgical instrument to the electrosurgical generator. For example, a user can electrically disconnect or decouple the electrosurgical generator from the electrosurgical instrument using the electrical connector. In such an example, the electrosurgical generator can be configured to transmit to, or receive data from, a memory of the electrosurgical instrument, such as in response to a user exceeding the maximum number of power source activations, or a maximum active time period of the electrosurgical instrument, defining the limit of the electrosurgical instrument. The data can be configured to enable the electrosurgical generator, or a different electrosurgical generator, to recognize that the electrosurgical instrument is expired, such as if the electrosurgical instrument is later reconnected to a different electrosurgical generator in preparation for a subsequent electrosurgical procedure. In response, the electrosurgical generator can disable the power source, as discussed above.

FIG. 12A illustrates a perspective view of an electrosurgical instrument 1000 with a hydrophobic layer 1002 deposited thereon. FIG. 12B illustrates a cross-section view of an electrosurgical instrument 1000 with a hydrophobic layer 1002 deposited thereon. FIGS. 12A-B are discussed below with reference to the electrosurgical system 100 shown in, and described above with regard to, FIGS. 1-2. The electrosurgical instrument 1000 can include any of the various aspects or features of electrosurgical devices discussed in U.S. Patent Application Publication No.: US 2021/0307859A1, the entire contents of which are hereby incorporated by reference. The electrosurgical instrument 1000 can be similar to the electrosurgical instrument 108 discussed above, at least in that the electrosurgical instrument 1000 can include a hydrophobic layer 1002, a first jaw 1004, a second jaw 1006, a first electrode plate 1008, and a second electrode plate 1010. The first electrode plate 1008 and the second electrode plate 1010 can be integral with the first jaw 1004 and the second jaw 1006, or the first electrode plate 1008 and the second electrode plate 1010 can be coupled to the first jaw 1004 and the second jaw 1006, respectively.

The first jaw 1004 or the second jaw 1006 of the electrosurgical instrument 1000 can include one or more jaw stops 1012. The jaw stops 1012 can generally be projections or protrusions extending outwardly from the first jaw 1004 or the second jaw 1006, such as outwardly beyond the first electrode plate 1008 or the second electrode plate 1010 toward the second jaw 1006 or the first jaw 1004, respectively. The jaw stops 1012 can be similar to the stops described in detail in U.S. Patent Application Publication No.: US 2021/0307859A1, such as in that the jaw stops 1012 can be configured to prevent conductive electrical contact, or a short circuit, between the first electrode plate 1008 and the second electrode plate 1010. For example, the jaw stops 1012 can prevent the first electrode plate 1008 from contacting the second electrode plate 1010 when the electrosurgical instrument 1000 is pivoted from an open position to a closed position as shown in and described with regard to FIG. 1. Each of the jaw stops 1012 can define an outer surface 1014 (FIG. 12B). The outer surface 1014 can be an outermost or otherwise most distal surface of each of the jaw stops 1012, such as relative to the first jaw 1004 or to the second jaw 1006. For example, the outer surface 1014 of each of the jaw stops 1012 located on the first jaw 1004 can contact the second electrode plate 1010 of the second jaw 1006, or the outer surface 1014 of each of the jaw stops 1012 located on the second jaw 1006 can contact the first electrode plate 1008, when the electrosurgical instrument 1000 is pivoted from an open position to a closed position.

The jaw stops 1012 can be electrically insulative. For example, each of the jaw stops 1012 can be made from non-conductive materials including, but not limited to, ceramics, plastics, glass, rubber, or porcelain. Any of the jaw stops 1012 can further be completely or partially covered by the hydrophobic layer 1002. Alternatively, the jaw stops 1012 can be entirely formed from a material that the hydrophobic layer 1002 is made from, such as polydimethylsiloxane, hexamethyldisiloxane, and tetramethyldisiloxane. In view of the above, the jaw stops 1012 can prevent a conductive electrical contact, or a short circuit, between the first electrode plate 1008 and the second electrode plate 1010 when the electrosurgical instrument 1000 is in the closed position by virtue of preventing the transfer of electrical energy therebetween. The hydrophobic layer 1002 can be similar to any of the hydrophobic layers or other coatings shown in and discussed with regard to FIGS. 1-11 above. The hydrophobic layer 1002 can contribute electrical resistance to the passage of electrical energy directly between various electrically conductive components of the electrosurgical instrument 1000, such as the first electrode plate 1008 and the second electrode plate 1010, or through the biological tissue 102 (FIG. 1) when the biological tissue 102 is positioned therebetween. For example, the hydrophobic layer 1002 can define a predetermined starting or known resistive value (e.g., before electrosurgical use of the electrosurgical instrument 1000), such as an impedance of about, but not limited to, 0-1 ohms, 1-3 ohms, or 4-5 ohms.

As also discussed with regard to FIGS. 1-11 above, the hydrophobic layer 1002 can erode or decrease in thickness as a function of normal electrosurgical use, such as fractionally decreasing in thickness each time the power source 144 of the electrosurgical generator 104 activates to output electrical energy to the electrosurgical instrument 1000, or continuously over an active time period during which the power source 144 is outputting electrical energy to the electrosurgical instrument 1000. As such, the amount of impedance or resistance that the hydrophobic layer 1002 contributes to the passage of electrical energy therethrough can decrease as the hydrophobic layer 1002 erodes. Accordingly, a resistive value associated with the hydrophobic layer 1002 during an electrosurgical procedure can indicate the thickness of the hydrophobic layer 1002 at the time such a resistive value is measured or otherwise obtained. In addition to the various methods and techniques described with regard to FIGS. 1-11, the electrosurgical generator 104 can be configured to prevent output of electrical energy to the electrosurgical device 106 when the predetermined limit of the electrosurgical instrument 108 (such as the electrosurgical instrument 1000) has been met or exceeded by monitoring a resistive value associated with (e.g., defined by) the hydrophobic layer 1002 at various points during an electrosurgical procedure.

For example, the control circuit 134 (FIGS. 1-2) of the electrosurgical generator 104 can be configured to measure at least one resistive value associated with the hydrophobic layer 1002 deposited on the first electrode plate 1008 and the second electrode plate 1010 via the measurement circuit 146 (FIG. 2) when the power source 144 (FIG. 2) is outputting electrical energy to the electrosurgical instrument 1000, such as in accordance with any of the methods and techniques described in International Publication No.: WO 2020/227519. For example, the at least one resistive value can be a direct current (DC) or an alternating current (AC) electrical values of the hydrophobic layer 1002 (such as resistance or impedance), a voltage difference delivered across and/or electrical current conducted by the hydrophobic layer 140, or a phase angle between voltage difference delivered across and electrical current conducted by the hydrophobic layer 140. As such, the control circuit 134 of the electrosurgical generator 104 can be configured to measure at least one resistive value associated with the hydrophobic layer 1002 deposited on the first electrode plate 1008 and the second electrode plate 1010 when the first electrode plate 1008 and the second electrode plate 1010 are in contact with one another or in contact with the biological tissue 102, such when the electrosurgical instrument 1000 is in a closed position, as will be discussed in greater detail with reference to FIG. 14. In other examples, the control circuit 134 of the electrosurgical generator 104 can be configured to measure at least one resistive value associated with the hydrophobic layer 1002 deposited on the first electrode plate 1004 and the second electrode plate 1006 when the first electrode plate 1008 and the second electrode plate 1010 are not in contact with one another, such when the electrosurgical instrument 1000 is in an open position. For example, the first electrode plate 1008 and the second electrode plate 1010 can be positioned in contact with a conductive member or liquid medium, such as, but not limited to, a saline solution extending between jaws to permit the transfer of electrical energy between the first electrode plate 1008 and the second electrode plate 1010.

The control circuit 134 can be configured to determine whether to allow or inhibit activation of the power source 144 based on the at least one measured resistive value, such as relative to whether the at least one measured resistive value is equal to or less than a predetermined threshold resistive value (e.g., a resistive value indicative or otherwise corresponding to a minimum thickness of the hydrophobic layer 1002 before which the hydrophobic layer 1002 changes from a first state to a second state as described with regard to FIGS. 8-9 above), or a change (e.g., delta) equal to or greater than the difference between the starting resistive value and the threshold resistive value. In other words, the measured resistive value can be compared to a starting resistive value for which the hydrophobic layer 1002 is new or unworn and inhibit activation of the power source 144 when the measured resistance value is a certain percentage of the starting resistance value. The electrosurgical system 100 can thereby monitor a thickness of the hydrophobic layer 1002 to prevent output of electrical energy to the electrosurgical instrument 1000 when the predetermined limit (e.g., a minimum thickness) of the electrosurgical instrument 1000 has been met or exceeded.

In some examples, one or more of the jaw stops 1012 of the electrosurgical instrument 1000 can be configured to help monitor the thickness of the hydrophobic layer 1002 during an electrosurgical procedure. For example, the jaw stops 1012 can be configured to cause conductive electrical contact, or a short circuit, within the electrosurgical instrument 1000 when the predetermined limit of the electrosurgical instrument 1000 has been met or exceeded, such as when the hydrophobic layer 1002 has eroded to the minimum thickness or otherwise changes from the first state to the second state on any of the first electrode plate 1008, the second electrode plate 1010, or the jaw stops 1012. In such examples, the jaw stops 1012 can include a conductive element 1016 (FIG. 12B). The conductive element 1016 can generally be one or more conductive filaments or wires, such as, but not limited to, silver, copper, gold, or other metallic strands. The conductive element 1016 can extend longitudinally through any of the jaw stops 1012, such as between the first electrode plate 1008, the second electrode plate 1010, or other electrical components of the electrosurgical instrument 1000 and the outer surface 1014 of each of the jaw stops 1012. In some examples, the conductive elements 1016 of the jaw stops 1012 can be in electrical communication with the electrosurgical generator 104, such as via circuitry extending through the first jaw 1008 and the second jaw 1006 to the electrosurgical generator 104, but electrically isolated from circuitry extending between the first electrode plate 1008 and the second electrode plate 1010 and the electrosurgical generator 104, such as to prevent the jaw stops 1012 from interfering with vessel sealing or tissue cauterizing operations accomplished by applying electrical energy to biological tissue via the first electrode plate 1008 and the second electrode plate 1010.

Any of the jaw stops 1012 can thereby be in electrical communication with various electrical components of the electrosurgical instrument 1000, the electrosurgical device 106, or the electrosurgical generator 104, such as including the control circuit 134 and the measurement circuit 146. In such examples, the conductive element 1016 and the outer surface 1014 can be covered by the hydrophobic layer 1002 at the beginning of an electrosurgical procedure, such as when the hydrophobic layer 1002 defines the starting thickness. Subsequently, when the hydrophobic layer 1002 has eroded to the minimum thickness or otherwise changes from the first state to the second state (e.g., completely or entirely eroded) on the outer surface 1014 of at least one of the jaw stops 1012, at least a portion of the conductive element 1016 along the outer surface 1014 can become exposed, such that the conductive element 1016 can contact, in various examples, the first electrode plate 1008, the second electrode plate 1010, or the conductive element 1016 of at least one the jaw stops 1012 opposingly located on the first jaw 1004 or the second jaw 1006 to allow electrical energy to travel therebetween.

In other examples, the jaw stops 1012 can further be configured to cause conductive electrical contact, or a short circuit, when the first electrode plate and the second electrode plate are in contact with the biological tissue 102. For example, the conductive element 1016 can include at least two conductive filaments or wires spaced laterally apart within the jaw stops 1012, such as, but not limited to, silver, copper, gold, or other metallic strands. Subsequently, when the hydrophobic layer 1002 has eroded to the minimum thickness or otherwise changes from the first state to the second state (e.g., completely or entirely eroded) on the outer surface 1014 of at least one of the jaw stops 1012, at least a portion of the at least two conductive filaments or wires of the conductive element 1016 can become exposed to allow electrical energy to travel therebetween. In still further examples, a thickness of the hydrophobic layer 1002 deposited on one or more of the jaw stops 1012 on the first jaw 1004 and one or more of the jaw stops 1012 on the second jaw 1006 can be thinner, or otherwise less thick, than a thickness of the hydrophobic layer 10002 deposited on the first electrode plate 1008 or the second electrode plate 1010. This can cause, for example, conductive electrical contact, or a short circuit, between the jaw stops 1012 on the first jaw 1004 and the jaw stops 1012 on the second jaw 1006 before the hydrophobic layer 1002 deposited on the first electrode plate 1008 and the second electrode plate 1010 erodes to a minimum thickness before which the hydrophobic layer 1002 changes from a first state to a second state. In view of the above, the jaw stops 1012 can create conductive electrical contact, or a short circuit, within at least one of the jaw stops 1012 by virtue of the conductive element 1016. The jaw stops 1012 can thereby be configured to cause conductive electrical contact, or a short circuit, within the electrosurgical instrument 1000. In response, the control circuit 134 can detect the conductive electrical contact or the short circuit and store an indication of the conductive electrical contact or the short circuit, such as on the memory 152 (FIG. 2) or the memory 148 (FIG. 2), to inhibit the power source 144 from activating. In some examples, as will be further discussed, the control circuit 134 of the electrosurgical generator 104 can be configured to monitor a delta between the starting resistive value and the at least one measured resistive on the jaw stops 1012 to help determine when the conductive electrical contact or the short circuit will occur, such as to generate an audible or visual alert before the conductive electrical contact or the short circuit occurs.

Figure 13:
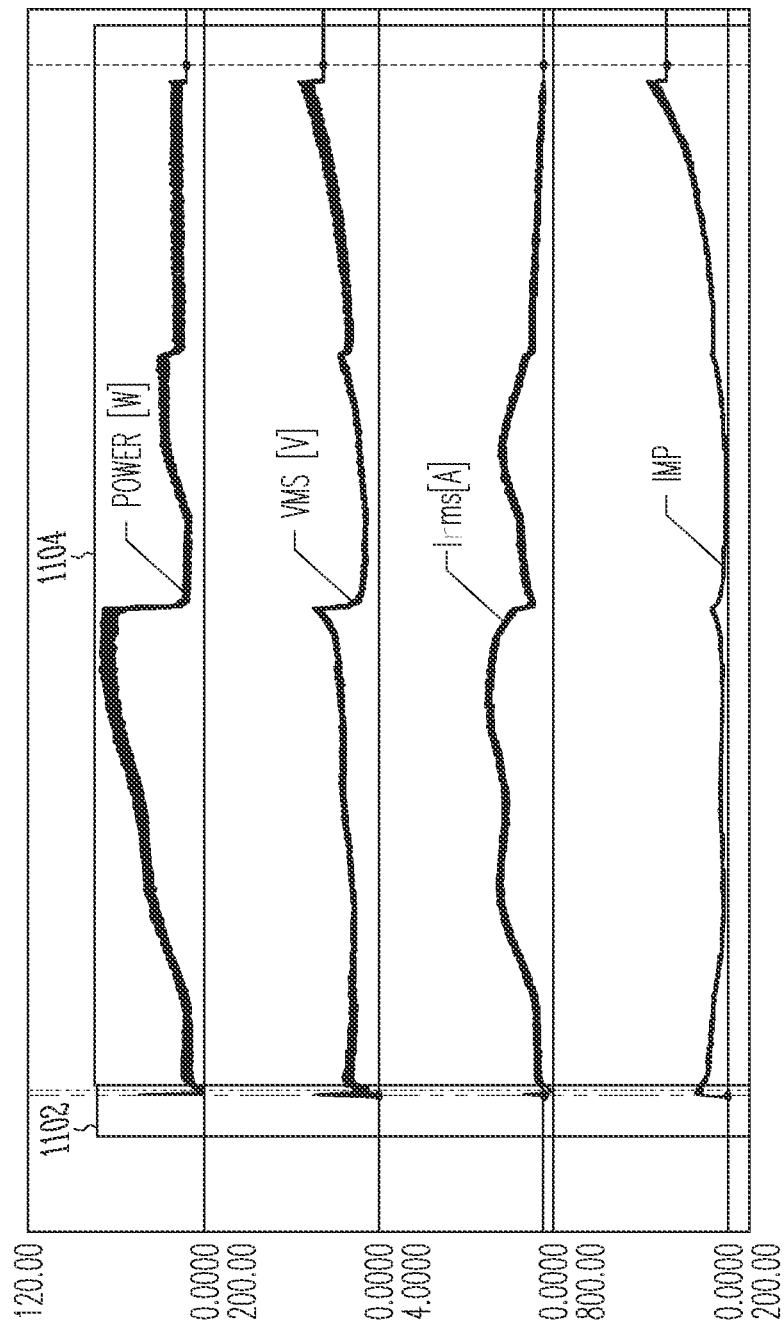
FIG. 13 illustrates an example waveform showing electrical energy traveling through biological tissue.

FIG. 13 illustrates an example waveform 1100 showing electrical energy traveling through biological tissue. FIG. 13 is discussed with reference to the electrosurgical system 100 shown in and described with reference to FIGS. 1-2. As discussed with regard to FIGS. 12A-B above, the electrosurgical generator 104 (FIGS. 1-2) can be configured to apply electrical energy to the biological tissue 102 to measure resistive values associated with the biological tissue 102 (FIG. 1) in conductive communication with at least one electrode, electrode plate, or other electrically conductive features of the electrosurgical instrument 108 (FIGS. 1-2), such as in accordance with the methods and techniques described in International Publication No.: WO 2020/227519. The electrosurgical generator 104 can be configured to perform similar methods and techniques to measure resistive values associated with the hydrophobic layer 140 (FIG. 1), such as to determine whether to enable or inhibit activation of the power source 144 (FIG. 2) based on at least one measured resistive value associated with the hydrophobic layer 140. For example, the control circuit 134 (FIGS. 1-2) of the electrosurgical generator 104 can be configured to control the power source 144 to cause the power source 144 to apply electrical energy to the electrosurgical instrument 108 (FIG. 1-2), and to any biological tissue in conductive communication therewith, in a first phase 1102 and/or a second phase 1104.

During the first phase 1102, the control circuit 134 can cause the power source 144 to activate to output an amount of electrical energy sufficient to enable the control circuit 134 to obtain at least one measured resistive value associated with the hydrophobic layer 140 at one or more points in time, such as the hydrophobic layer 1002 deposited on the first electrode plate 1008, the second electrode plate 1010, or the jaw stops 1012 of the electrosurgical instrument 1000 of FIGS. 12A-B. In various examples, the measured resistive value can be an any of, but not limited to, a direct current (DC) or an alternating current (AC) electrical value of the hydrophobic layer 1002 (such as resistance or impedance), a voltage difference delivered across and/or electrical current conducted by the hydrophobic layer 140, or a phase angle between voltage difference delivered across and electrical current conducted by the hydrophobic layer 140. For example, the amount of electrical energy output by the power source 144 during the first phase 1102 can be low, but is not zero, such that the amount of energy output about by the power source 144 does not substantially affect or materially change any biological tissue in conductive communication with the electrosurgical instrument 108. For example, the amount of energy output by the power source 144 during the first phase 1102 can be about, but not limited to, 4-6 watts, 7-9 watts or 10-12 watts. The first phase 1102 can also be limited to a predetermined or user selected time limit or time window. For example, the time window of the first phase 1102 can be about, but not limited to, about 200-250 milliseconds, 251-300 milliseconds, or 301-350 milliseconds in length.

In response, based on at least one measured resistive value associated with the hydrophobic layer 140, the control circuit 134 can be configured to determine whether to enable or inhibit subsequent activation of the power source 144. For example, the control circuit 134 can compare the measured resistive value associated with the hydrophobic layer 140 to other resistive values, such as corresponding to or otherwise indicate of a thickness of the hydrophobic layer 140, associated with the hydrophobic layer 140, such as a starting resistive value, a previously measured resistive value, or a threshold resistive value to help determine whether the hydrophobic layer 140 has, or when the hydrophobic layer 140 will, change from the first state to the second state. The electrosurgical system 100 can thereby monitor a thickness of the hydrophobic layer 140 to prevent output of electrical energy to the electrosurgical instrument 108 when the predetermined limit (e.g., a minimum thickness) of the electrosurgical instrument 108 has been met or exceeded.

If the control circuit 134 determines that the limit of the electrosurgical instrument 108 has not been met or exceeded, and that the electrosurgical instrument 108 is in conductive engagement with biological tissue, the control circuit 134 can be configured to proceed to the second phase 1104. During the second phase 1104, the control circuit 134 can cause the power source 144 to activate to output an amount of electrical energy sufficient to substantially affect or materially change the biological tissue in conductive communication with the electrosurgical instrument 108, such as to seal vessels engaged by the electrosurgical instrument 108 in accordance with any of the methods and techniques described in International Publication No.: WO 2020/227519. For example, the amount of electrical energy delivered to the electrosurgical instrument 108 during the second phase can be higher relative to the amount of electrical energy delivered to the electrosurgical instrument during the first phase 1102, such as about, but not limited to, 13-40 watts, 41-70 watts, or 71-100 watts. The amount of electrical energy delivered to the electrosurgical instrument 108 during the first phase 1102 or the second phase 1104 can depend on various factors, such as the inherent resistance or impedance within various components of the electrosurgical generator 104, the electrosurgical instrument 108, or the electrosurgical device 106 (FIGS. 1-2), a contact area of electrode(s), electrode plate(s), or other electrically conductive features of the electrosurgical instrument 108, an ability of the control circuit 134 to measure resistive values from electrical feedback, a length of a cable coupling the electrosurgical device 106 to the electrosurgical generator 104, among other factors. Further, the amount of electrical energy delivered to the electrosurgical instrument 108 during the first phase 1102 or the second phase 1104, the frequency at which the first phase 1102 is conducted relative to the second phase 1104, or the type or category of the resistive value to be measured, can be pre-tuned or pre-adjusted, or user-tuned or user-adjusted, such as by one or more inputs to the user interface 136 (FIGS. 1-2) of the electrosurgical generator 104.

Additionally, the control circuit 134 can be configured to continuously, or periodically, conduct the first phase 1102 before the second phase 1104. For example, a user can select or otherwise configure the frequency the control circuit 134 conducts the first phase 1102, such as relative to the second phase 1104. For example, the control circuit 134 can conduct the first phase 1102 upon every activation of the power source 144, such as to continuously monitor the thickness of the hydrophobic layer 140 during an electrosurgical procedure. In other examples, the control circuit 134 can conduct the first phase 1102 upon other intervals, such as every second, every third, or every fourth activation of the power source 144. Alternatively, the control circuit 134 can conduct the first phase 1102 based upon a predetermined or user-selected time interval, such as relative to the aggregate active time period of the power source 144 described above with regard to FIGS. 1-2.

Figure 14:
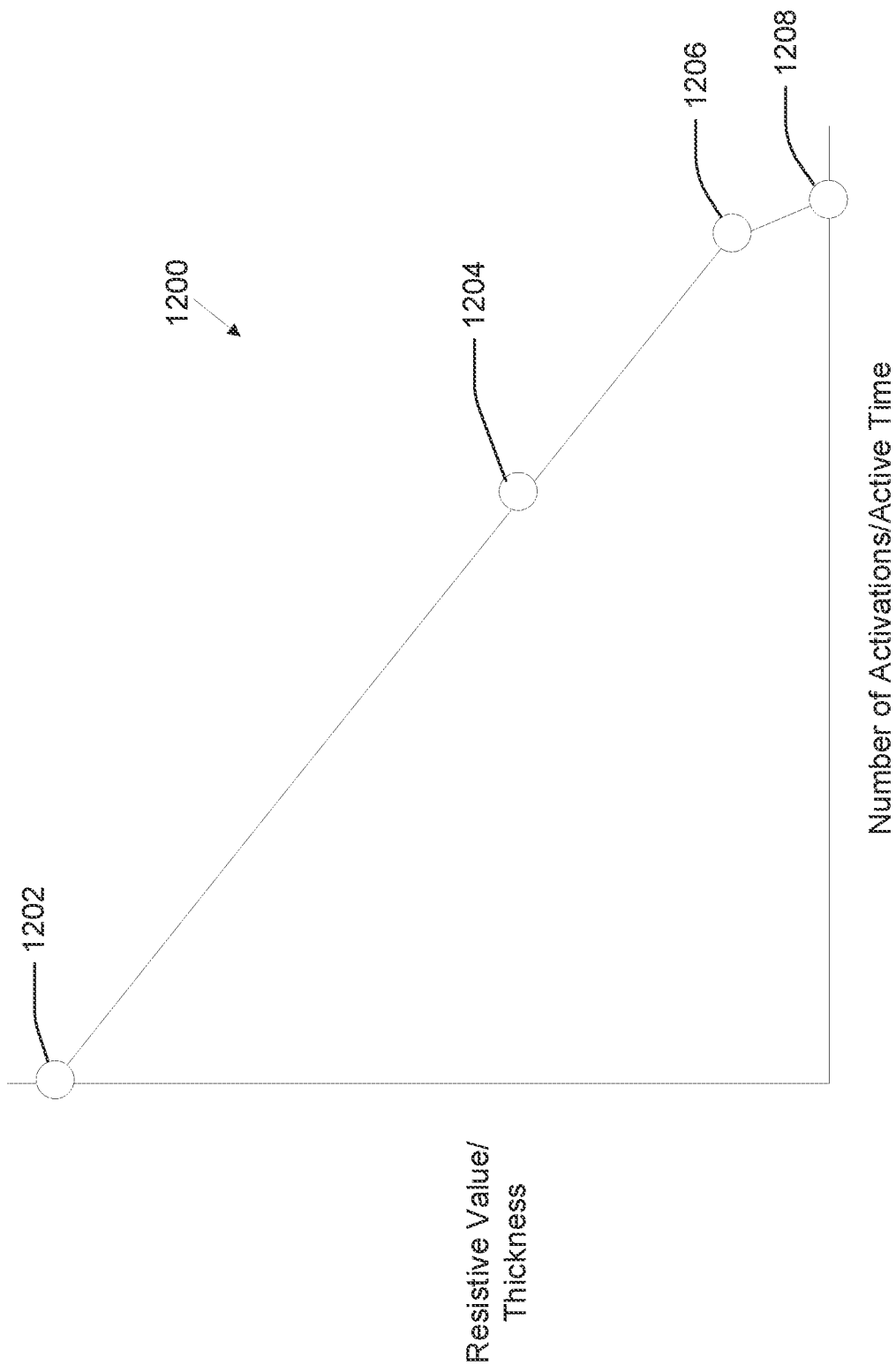
FIG. 14 illustrates an example graph showing an erosion curve of a hydrophobic layer as a function of the application of electrical energy to the hydrophobic layer.

FIG. 14 illustrates an example graph showing an erosion curve 1200 of a hydrophobic layer 140 as a function of the application of electrical energy to the hydrophobic layer 140. FIG. 14 is discussed with reference to the electrosurgical system 100 shown in and described with regard to FIGS. 1-2. The hydrophobic layer 140 (FIG. 1) can erode linearly, logarithmically, or exponentially, such as based on, but not limited to, an amount of electrical energy delivered upon each activation of the power source 144 (FIG. 2), a chemical composition of the hydrophobic layer 140, among other factors. In order to help monitor erosion of the thickness of the hydrophobic layer 140 during an electrosurgical procedure, various points along the erosion curve 1200 corresponding to or otherwise indicate of incremental erosion of the hydrophobic layer 140 can be selectively chosen. For example, as shown in FIG. 14, the erosion curve 1200 can include a starting resistive value 1202, a reference resistive value 1204, a threshold resistive value 1206, and a terminal resistive value 1208.

In some examples, the starting resistive value 1202 can be a predetermined resistive value or a range of resistive values associated with the hydrophobic layer 140, such as stored on the memory 148, corresponding to a predetermined or otherwise be indicative of a starting thickness of the hydrophobic layer 140 (e.g., before the application of electrical energy to the electrosurgical instrument 108). In other examples, the starting resistive value 1202 can be a measured resistive value, such as a first measured resistive value corresponding to or otherwise indicative of the starting thickness of the hydrophobic layer 140. The reference resistive value 1204 can be a resistive value or range of resistive values corresponding to or otherwise indicative of a thickness of the hydrophobic layer 140 that is less than the starting thickness, such as to about, but not limited to, 41-55, 56-70, 71-90 percent of the starting thickness. For example, if the starting resistive value 1202 associated with the hydrophobic layer 140 is about 1 ohm, then the reference resistive value 1204 can be about, but not limited to, 0.41-0.55 ohms, 0.56-0.70 ohms, or 0.71-0.90 ohms. The reference resistive value 1204 can be a resistive value or a range of resistive values corresponding to or otherwise indicative of a particular thickness of the hydrophobic layer 140 that is less than a thickness associated with the starting resistive value 1202, such as to about, but not limited to, 41-55, 56-70, 71-90 percent of the starting thickness. For example, if the starting resistive value 1202 associated with the hydrophobic layer 140 is about 1 ohm, then the reference resistive value 1204 can be about, but not limited to, 0.41-0.55 ohms, 0.56-0.70 ohms, or 0.71-0.90 ohms. The reference resistive value 1204 can be a value at which the operator will start to receive notifications or warnings, such as an audible or visual alert, as described herein, that the hydrophobic layer 140 is nearing a degradation point, (e.g., the threshold resistive value 1206, where the coating will no longer be effective to a desired level when it changes from the first state to the second state) and, as such, the user or operator should begin to take steps to ensure that the procedure can be completed.

The threshold resistive value 1206 can be a resistive value or a range of resistive values corresponding to or otherwise indicative of a thickness of the hydrophobic layer 140 that is less than a thickness associated with the reference resistive value 1204, such as to about 0-10, 11-24, or 25-40 percent of the starting thickness. For example, if the starting resistive value 1202 is about 1 ohm, then the threshold resistive value 1206 can be about 0.1-0.24 ohms, or 0.25-0.40 ohms. In some examples, the threshold resistive value 1206 can also correspond to a minimum thickness of the hydrophobic layer 140 before which the hydrophobic layer 140 changes from a first state to a second state, such as discussed with regard to FIGS. 8-9 and 12A-B above. As such, the threshold resistive value 1206 can be a resistive value or range of resistive values at which the control circuit 134 of the electrosurgical generator 104 will, for example, inhibit activation of the power source 144 to prevent the output of electrical energy to the electrosurgical instrument 108. Accordingly, in some examples, the control circuit 134 can be configured to inhibit activation of the power source 144 at the threshold resistive value 1206, or within a range of resistive values leading up to the threshold resistive value 1206, in order to provide, for example, a deactivation window. The terminal resistive value 1208 can be a resistive value or a range of resistive values corresponding to or otherwise indicative of complete or near-complete erosion of the hydrophobic layer 140 from at least a portion of the electrosurgical instrument 108 to which it was originally deposited. For example, if the starting resistive value 1202 is about 1 ohm, then a resistive value corresponding to a conductive electrical contact, or a short circuit, within the electrosurgical instrument 108 can be about 0-0.1 ohms. As such, in various examples, the threshold resistive value 1206 or the terminal resistive value 1208 can correspond to or otherwise be indicative of a conductive electrical contact, or a short circuit, within the electrosurgical instrument 108, such as provided by the jaw stops 1012 shown in FIGS. 12A-B.

In the operation of some examples, the processor 150 can receive, retrieve and/or process instructions or data to cause the processor 150 to match or otherwise associate the electrosurgical instrument 108 in electrical communication with the electrosurgical generator 104 with data located on the memory 148 and/or 152. For example, the memory 152 can include identifying data associated with the electrosurgical instrument 108, and the memory 148 can include thereon, or be in network communication with, a library of information (e.g., database) relating to various different electrosurgical instruments (such as those shown in, but not limited to, FIGS. 4-7 and 12) and their respective predetermined limits, such as defined by the threshold resistive value 1206 or the terminal resistive value 1208. In such examples, the processor 150 can receive, retrieve and/or process instructions or data to, upon connection of the electrosurgical instrument 108 to the electrosurgical generator 104, cause the processor 150 to obtain the identifying data from the memory 152 of the electrosurgical instrument 108. The processor 150 can then receive, retrieve and/or process instructions or data to look up an individual data set (e.g., data base entry) defining or otherwise including any of the starting resistive value 1202, the reference resistive value 1204, the threshold resistive value 1206, and the terminal resistive value 1208 of the electrosurgical instrument 108, such as by matching the identifying data of the electrosurgical instrument 108 to associated data stored on the memory 148. In other examples, the processor 150 can receive, retrieve and/or process instructions or data to cause the processor 150 to directly retrieve any of the starting resistive value 1202, the reference resistive value 1204, the threshold resistive value 1206, or the terminal resistive value 1208 of the electrosurgical instrument 108 from the memory 152 of the electrosurgical instrument 108. The processor 150 can also receive, retrieve and/or process instructions or data to cause the transceiver to wirelessly receive or transmit data to the memory 148 using any of various wireless protocols, such as described with regard to FIG. 2 above. Thus, the control circuit 134 can be configured to identify, for example, the starting resistive value 1202, the reference resistive value 1204, the threshold resistive value 1206, or the terminal resistive value 1208, or various other predetermined resistive values along the erosion curve 1200 or other erosion curves of other erodible coatings.

The electrosurgical generator 104 can be configured to monitor a thickness of the hydrophobic layer 140 during an electrosurgical procedure. For example, the processor 150 can receive, retrieve and/or process instructions or data to cause the processor 150 to control the measurement circuit 146 and activate the power source 144 to measure at least one resistive value associated with the biological tissue, such as when the first electrode plate 1008 and the second electrode plate 1010 of FIGS. 12A-B are in contact with one another or at least one of the jaw stops 1012, or when at least one of the jaw stops 1012 of the first jaw 1004 is in contact with at least one of the jaw stops of the second jaw 1006, or when biological tissue is in conductive communication with at least the first electrode plate 1008 and the second electrode plate 1010. In some examples, the processor 150 can receive, retrieve and/or process instructions or data to control the measurement circuit 146 and the power source 144 to measure a plurality of resistive values associated with the hydrophobic layer 1002 over a predetermined, such as stored on the memory 148, or intra-procedurally selected, such selectable via one or more user inputs to the user interface 136, period of time. In such examples, the processor 150 can receive, retrieve and/or process instructions or data to calculate an average measured resistive value from the plurality of measured resistive values to help improve the accuracy of a measured resistive value usable for comparison to the reference resistive value 1204, the threshold resistive value 1206, or the terminal resistive value 1208.

In other examples, such as when biological tissue is in conductive communication with the electrosurgical instrument 1000 (e.g., located between and in contact with the first electrode plate 1008 (FIGS-12A-B) and the second electrode plate 1010 (FIGS. 12A-B)), the processor 150 can receive, retrieve and/or process instructions or data to cause the processor 150 to subtract a measured resistive value associated with the biological tissue 102 from the starting resistive value 1202 of the hydrophobic layer 140. The processor 150 can receive, retrieve and/or process instructions or data to cause the processor 150 to calculate a change (e.g., a delta) between the starting resistive value 1202 and a remainder of a subtraction of the measured resistive value associated with the biological tissue 102 from the starting resistive value 1202 to obtain a measured resistive value associated with the hydrophobic layer 140. The processor 150 can then receive, retrieve and/or process instructions or data to cause the processor 150 to compare the measured resistive value associated with the hydrophobic layer 140 to any of the reference resistive value 1204, the threshold resistive value 1206, or the terminal resistive value 1208, such as upon every activation of the power source 144 or upon other intervals including, but not limited to, a number of activations of the power source 144, or a predetermined or intra-procedurally configured time window implemented by the processor 150 in response to one or more user inputs to the user interface 136.

For example, if the measured resistive value associated with the hydrophobic layer 140 and the starting resistive value 1202 is equal to or greater than any of the reference resistive value 1204 or the threshold resistive value 1206, the control circuit 134 can determine that the hydrophobic layer 140 has not eroded to a minimum thickness or changed from a first state to a second state. In response, the processor 150 can receive, retrieve and/or process instructions or data to subsequently activate, or enable activation of, the power source 144 to output electrical energy to the electrosurgical instrument 108, such as discussed with regard to FIG. 2. If a measured resistive value is equal to or less than any of the reference resistive value 1204, the threshold resistive value 1206, or the terminal resistive value 1208, the processor 150 can receive, retrieve and/or process instructions or data to cause the processor 150 to inhibit or otherwise prevent subsequent activation of the power source 144 by interrupting signal communication between any input devices of the electrosurgical system 100, such as the electrosurgical device 106 or the user interface 136, and the power source 144, such as until a different (e.g., a non-expired) electrosurgical instrument 108 is connected to electrosurgical generator 104.

Additionally, when the predetermined limit of the electrosurgical instrument 108 has been exceeded, such as when at least one measured resistive value is equal to or less than the threshold resistive value 1206 or the terminal resistive value 1208, the control circuit 134 can be configured to transfer data to the memory 152 to prevent subsequent reuse of the electrosurgical instrument 108 after the electrosurgical procedure has concluded. For example, if the electrosurgical instrument 108 is later reprocessed and coupled to a different electrosurgical generator, the processor 150 can receive, retrieve and/or process instructions or data to cause the processor 150 to receive (e.g., read) the stored data on the memory 152, and in response, inhibit activation of the power source 144 to prevent electrical energy from being output to the electrosurgical instrument 108.

The control circuit 134 can further be configured to initiate a timer, or count a number of subsequent activations of the power source 144, when the at least one measured resistive value associated with the hydrophobic layer 140 is equal to or less than the reference resistive value 1204 or greater than the threshold resistive value 1206, such as by a predetermined percentage or numerical amount, and inhibit activation of the power source 144 after a time window has elapsed or after a particular number of activations of the power source 144 have occurred. For example, the processor 150 can receive, retrieve and/or process instructions or data to count and store or a number seconds or minutes on the memory 148 or 152, or a subsequent aggregate number of activations of the power source 144, after the control circuit 134 has determined that a measured resistive value associated with the hydrophobic layer 140 is equal to or less than the reference resistive value 1204 or the threshold resistive value 1206. This can prevent, for example, reuse of an expired electrosurgical instrument after an electrosurgical procedure has concluded, while concurrently allowing a user to continue applying electrical energy to tissue in situations where a replacement instrument may not be readily available, or where intraprocedural replacement of an instrument is difficult or impractical.

The control circuit 134 can be configured to cause the user interface 136 to output an audible or a visual alert upon initiating the timer, or upon beginning counting an aggregate number of activations of the power source 144. For example, the processor 150 can receive, retrieve and/or process instructions or data to cause the user interface 136 to generate and output audible or a visual alert to a user, such as shown in and further discussed with regard to FIG. 3. Such an audible or a visual alert can correspond a determination made by the processor 150 that the measured resistive value associated with the hydrophobic layer 140 is less than or equal to any of the reference resistive value 1204, the threshold resistive value 1206, or the terminal resistive value 1208. In some examples, such an audible or a visual alert can correspond to a user-selected resistive value or delta between the starting resistive value 1202 and a measured resistive value associated with the hydrophobic layer 140, such as configured by one or more user inputs to the user interface 136.

Figure 15:
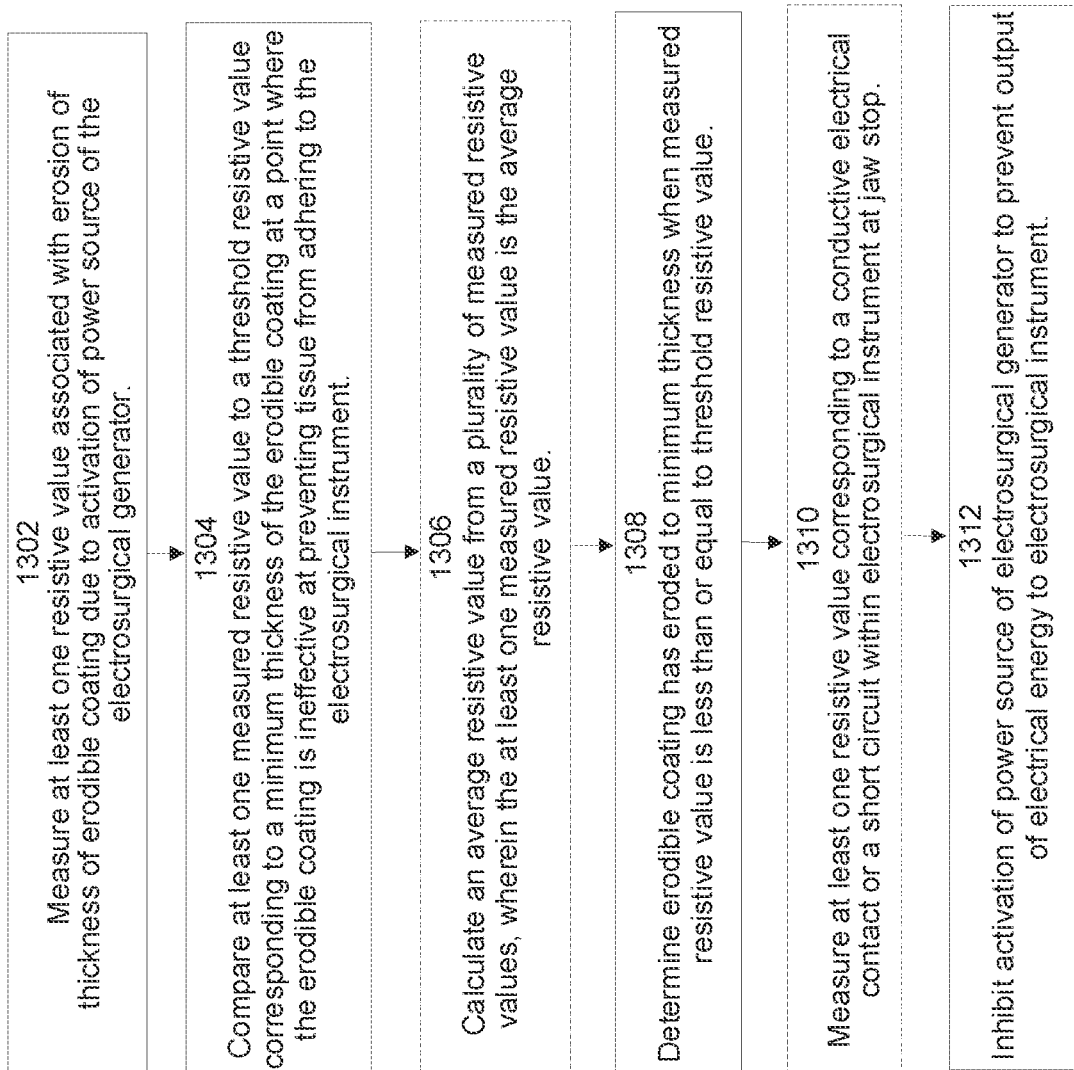
FIG. 15 illustrates a flow chart of an example method for controlling output of electrical energy from an electrosurgical generator to an interconnected electrosurgical instrument based on a thickness of an erodible coating deposited on the electrosurgical instrument.

FIG. 15 illustrates a flow chart of an example method 1300 for controlling output of electrical energy from an electrosurgical generator to an interconnected electrosurgical instrument based on a thickness of an erodible coating deposited on the electrosurgical instrument. The steps or operations of the method 1300 are illustrated in a particular order for convenience and clarity. The discussed operations can be performed in parallel or in a different sequence without materially impacting other operations. The method 1300 as discussed includes operations that can be performed by multiple different actors, devices, and/or systems. It is understood that subsets of the operations discussed in the method 1300 can be attributable to a single actor device, or system, and could be considered a separate standalone process or method.

The method 1300 can begin with operation 1302. The operation 1302 includes measuring at least one resistive value corresponding to the thickness of the erodible coating. For example, a user, such as a surgeon or clinician, can initiate delivery of electrical energy to biological tissue in contact with an electrode or electrode plate of the electrosurgical instrument on which the erodible coating is deposited in order to obtain a measured resistive associated with the erodible coating. In other examples, a user, such as a surgeon or clinician, can initiate delivery of electrical energy to an electrosurgical instrument on which the erodible coating is deposited in order to obtain a measured resistive associated with both the erodible coating and the biological tissue. In other examples, a user, such as a surgeon or clinician, can initiate delivery of electrical energy to biological tissue in contact with an electrode or electrode plate of the electrosurgical instrument on which the erodible coating is deposited in order to first obtain a measured resistive associated with the erodible coating. The control circuit of the electrosurgical generator can then subtract the measured resistive value associated with the biological tissue from a predetermined starting resistive value of the erodible coating. Subsequently, the control circuit can calculate a delta between the remainder of the subtraction of the measured resistive value associated with the biological tissue from the predetermined starting resistive value of the erodible coating to obtain a measured resistive value associated with the erodible coating, such as indicative of the resistance or impedance to the passage of electrical energy through the biological tissue contributed or otherwise caused by the erodible coating.

The operation 1302 can optionally first include obtaining the threshold resistive value by exchanging information between a memory or RFID or NFC transceiver of the electrosurgical generator and a memory or an RFID or NFC tag of the electrosurgical instrument, respectively. For example, connecting the electrosurgical instrument to the electrosurgical generator can include providing power to the RFID or NFC tag, such as to enable wireless data transmission or reception between the RFID or NFC transceiver and the RFID or NFC tag.

The operation 1302 can include pivoting a first jaw and a second jaw from an open position to a closed position to engage biological tissue located therebetween. For example, a user can operate a gripping lever of an electrosurgical device including the electrosurgical instrument by moving the gripping lever proximally toward a handle of the electrosurgical device, to thereby cause the first jaw to pivot toward the second jaw and concurrently cause at least one of the first jaw or the second jaw to contact biological tissue positioned between the first jaw and the second jaw. The operation 1302 can include pivoting a first jaw and a second jaw from an open position to a closed position to cause a first electrode plate located on the first jaw to contact a second electrode plate located on the second jaw. For example, a user can operate a gripping lever of an electrosurgical device including the electrosurgical instrument by moving the gripping lever proximally toward a handle of the electrosurgical device, to thereby cause the first jaw to pivot toward the second jaw and concurrently cause the first electrode plate to contact the second electrode plate.

The method 1300 can include operation 1304. The operation 1304 includes comparing at least one measured resistive value to a threshold resistive value corresponding to a minimum thickness of the erodible coating before which the erodible coating changes from a first state to a second state. For example, a control circuit of the electrosurgical generator can compare at least one measured resistive value associated with the erodible coating to a reference resistive value or a threshold resistive value associated with incremental erosion of the erodible coating. The operation 1304 can include wherein comparing the at least one measured resistive value to the threshold resistive value is performed by the electrosurgical generator upon each activation of the power source. For example, the control circuit of the electrosurgical generator can compare the at least one measured resistive value associated with the erodible coating to the threshold resistive value upon every activation of the power source or upon other time intervals such including, but not limited to, a number of activations of the power source or a predetermined or intra-procedurally set time window implemented by the processor, such as in response to one or more user inputs to a user interface of the electrosurgical generator.

The method 1300 can optionally include operation 1306. The operation 1306 includes calculating an average resistive value from a plurality of measured resistive values, and wherein the at least one measured resistive value is the average resistive value. For example, the control circuit can control a measurement circuit and the power source of the electrosurgical generator to measure a plurality of resistive values associated with the biological tissue 102, such as over or during a predetermined or intra-procedurally selected period of time or time window. In such examples, the control circuit can calculate an average measured resistive value from the plurality of measured resistive values, such as to help improve the accuracy of the measured resistive value relative to the actual erosion of the erodible coating.

The method 1300 can include operation 1308. The operation 1308 includes determining the erodible coating has eroded to the minimum thickness when the measured resistive value is less than or equal to the threshold resistive value. For example, a control circuit of the electrosurgical generator can calculate a difference between the measured resistive value and the threshold resistive value, and based on the difference between the measured resistive value and the threshold resistive value, determine whether the measured resistive value is greater than, equal to, or less than the threshold resistive value.

The operation 1308 can include storing information on a memory or an RFID or NFC tag of the electrosurgical instrument indicating that the erodible coating has eroded to the minimum thickness. For example, after the control circuit has determined that erodible coating has eroded to the minimum thickness, the control circuit can store an indication that the erodible coating has eroded to the minimum thickness on a memory of the electrosurgical generator or the electrosurgical instrument. In some examples, the electrosurgical generator can include a radio frequency identification (RFID) or near-field communication (NFC) wireless transceiver; and the electrosurgical instrument can include an inlay or hard tag, such as including an antenna and a memory, such as to enable wireless data transmission or reception between the RFID or NFC transceiver and the RFID or NFC tag. The operation 1308 can include generating an audible or visual alert indicating that the erodible coating has eroded to the minimum thickness. For example, the control circuit can cause a user interface of the electrosurgical generator to generate and output an audible or a visual alert upon determining that the erodible coating has eroded to the minimum thickness.

The operation 1308 can include initiating a timer before the minimum thickness is reached to prevent the electrosurgical generator from inhibiting activation of the power source when a time window has elapsed. For example, a processor of a control circuit of the electrosurgical generator can receive, retrieve and/or process instructions or data to count and store or a number of seconds or minutes on a memory of the electrosurgical generator after the control circuit has determined that a measured resistive value associated with the erodible coating is equal to or less than a reference resistive value, for example, that is greater than the threshold resistive value corresponding to the minimum thickness of the erodible coating.

The method 1300 can optionally include operation 1310. The operation 1310 includes measuring at least one resistive value corresponding to a conductive electrical contact, or a short circuit, within the electrosurgical instrument at a jaw stop. For example, the jaw stop can include at least two electrically conductive elements positioned on or otherwise included or integrated therein and configured to cause a conductive electrical contact, or a short circuit, detectable by the processor of the control circuit of the electrosurgical generator when at least a portion of the erodible coating deposited on the jaw stop erodes to the minimum thickness of the erodible coating.

The method 1300 can include operation 1312. The operation 1312 can include inhibiting activation of the power source of the electrosurgical generator to prevent output of electrical energy to the electrosurgical instrument. For example, a control circuit of the electrosurgical generator can disable the power source, such as by inhibiting or otherwise preventing the electrosurgical instrument from effectively calling for activation via operation of an energy button of an electrosurgical device including the electrosurgical instrument, or by inhibiting or otherwise preventing electrical energy generated upon activation of the power source from being output to the electrosurgical instrument by interrupting signal communication between the electrosurgical device and the power source of the electrosurgical generator.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein. In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable media or machine-readable media encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

NOTES AND EXAMPLES

The following, non-limiting examples, detail certain aspects of the present subject matter to solve the challenges and provide the benefits discussed herein, among others.

Example 1 is an electrosurgical generator configured to generate electrical energy to be applied to biological tissue via electrical communication with an electrosurgical instrument, the electrosurgical generator comprising: a power source configured to activate to output the electrical energy to the electrosurgical instrument; a measurement circuit configured to measure a resistive value associated with an erodible coating deposited on a portion of the electrosurgical instrument; and a control circuit in communication with the power source and the measurement circuit, the control circuit configured to: compare a measured resistive value of the erodible coating to a threshold resistive value of the coating; and control activation of the power source based on the comparison between the measured resistive value and the threshold resistive value.

In Example 2, the subject matter of Example 1 includes, wherein the threshold resistive value corresponds to a known resistive value corresponding to a thickness of the erodible coating before which the erodible coating changes from a first state to a second state or a previously measured resistive value representing a starting resistive value of the coating.

In Example 3, the subject matter of Example 2 includes, wherein the erodible coating has a surface adherence to the biological tissue in the first state that is less than a surface adherence to the biological tissue of a material of the portion of the electrosurgical instrument that the coating is disposed on.

In Example 4, the subject matter of Examples 1-3 includes, wherein the erodible coating is a non-stick hydrophobic layer selected from one of polydimethylsiloxane, hexadimethyldisiloxane, and tetramethyldisiloxane.

In Example 5, the subject matter of Examples 1-4 includes, wherein the measured resistive value and the threshold resistive value are indicative of at least one of resistance, impedance, or phase angle, and wherein the control circuit is configured to compare the measured resistive value to the threshold resistive value upon each activation of the power source.

In Example 6, the subject matter of Examples 1-5 includes, wherein the control circuit is configured to control activation of the power source by inhibiting activation of the power source if the measured resistive value is less than or equal to the threshold resistive value.

In Example 7, the subject matter of Example 6 includes, wherein the electrosurgical generator includes a user interface in electrical communication with the control circuit, and wherein the control circuit is configured to cause the user interface to output an audible or a visual alert upon inhibiting activation of the power source.

In Example 8, the subject matter of Examples 1-7 includes, wherein the electrosurgical generator includes a user interface in electrical communication with the control circuit, and wherein the control circuit is configured to cause the user interface to output an audible or a visual alert if the measured resistive value is less than or equal to a reference resistive value, and wherein the reference resistive value is greater than the threshold resistive value.

In Example 9, the subject matter of Examples 1-8 includes, wherein the control circuit is configured to initiate a timer if the measured resistive value is equal to or greater than the threshold resistive value by a predetermined percentage and inhibit activation of the power source after the timer has elapsed.

In Example 10, the subject matter of Example 9 includes, wherein the electrosurgical generator includes a user interface in electrical communication with the control circuit, and wherein the control circuit is configured to cause the user interface to output an audible or a visual alert upon initiating the timer.

In Example 11, the subject matter of Examples 1-10 includes, wherein the control circuit is configured to count a number of activations of the power source if the measured resistive value is equal to or greater than the threshold resistive and inhibit activation of the power source after a threshold number of power source activations has occurred.

In Example 12, the subject matter of Examples 1-11 includes, wherein the measured resistive value is an average value of a plurality of measured resistive values, and wherein the control circuit is configured to store the plurality of measured resistive values and periodically calculate the average value from the plurality of measured resistive values.

In Example 13, the subject matter of Examples 1-12 includes, wherein the control circuit is in electrical communication with a database including a plurality of database entries each defining a threshold resistive value of a different electrosurgical instrument, wherein the electrosurgical instrument includes a memory containing data matchable by the control circuit to an individual database entry.

In Example 14, the subject matter of Examples 1-13 includes, wherein the threshold resistive value is a resistive value corresponding to a conductive electrical contact, or short circuit, within the electrosurgical instrument when the erodible coating has eroded to a thickness before which the erodible coating changes from a first state to a second state or a previously measured resistive value representing a starting resistive value of the coating.

Example 15 is an electrosurgical system, comprising: an electrosurgical instrument configured to apply electrical energy to biological tissue; an electrosurgical generator for providing the electrical energy to the electrosurgical instrument, the electrosurgical generator including: an electrical connector configured to electrically couple the electrosurgical instrument to the electrosurgical generator; a power source configured to activate to output the electrical energy to the electrosurgical instrument; a measurement circuit configured to measure a resistive value associated with erosion of an erodible coating due to activation of the power source deposited on a portion of the electrosurgical instrument; and a control circuit including a generator component located within the electrosurgical generator and an instrument component located within the electrosurgical instrument, the control circuit configured to: compare a measured resistive value of the erodible coating to a threshold resistive value of the coating; and control activation of the power source based on the comparison between the measured resistive value and the threshold resistive value.

In Example 16, the subject matter of Example 15 includes, wherein the generator component is a memory of the control circuit or an RFID or NFC transceiver, and the instrument component is a programmable memory or an RFID or NFC tag, respectively.

In Example 17, the subject matter of Examples 15-16 includes, wherein the erodible coating comprises a non-stick coating configured to prevent tissue from adhering to the electrosurgical instrument; wherein a thickness of the erodible coating is configured to erode; wherein the threshold resistive value corresponds to a minimum thickness of the erodible coating before which the erodible coating changes from a first state to a second state; and wherein the control circuit is configured to store information on the instrument component or the generator component relating to the minimum thickness.

In Example 18, the subject matter of Example 17 includes, wherein the electrosurgical instrument is a forceps including: a first jaw and a second jaw pivotable between an open position and a closed position, the first jaw including a jaw stop extending outwardly from the first jaw toward the second jaw, wherein the jaw stop is in electrical communication with the control circuit and is configured to contact the second jaw when the first jaw and the second jaw are in the closed position, and wherein the erodible coating is deposited on at least one of: the jaw stop, along a portion of the first jaw, along a portion of the second jaw.

In Example 19, the subject matter of Example 18 includes, a plurality of jaw stops spaced laterally apart relative to one another along the first jaw, wherein at least one of the plurality of jaw stops is in electrical communication with the control circuit and at least one of the plurality of jaw stops is electrically insulative.

In Example 20, the subject matter of Example 19 includes, wherein the measured resistive value is an average value of a plurality of measured resistive values measured at a first jaw stop in electrical communication with the control circuit, and wherein the control circuit is configured to calculate the average value from the of measured resistive values.

In Example 21, the subject matter of Examples 18-20 includes, wherein the threshold resistive value is a resistive value corresponding to a conductive electrical contact, or a short circuit, within the electrosurgical instrument, wherein the jaw stop includes a plurality of electrically conductive strands extending between the first jaw and a distal surface of the jaw stop, and wherein the electrically conductive strands are configured to cause the conductive electrical contact, or the short circuit, within the electrosurgical instrument when the erodible coating has eroded to the minimum thickness.

Example 22 is a method for controlling output of electrical energy from an electrosurgical generator to an interconnected electrosurgical instrument based on a thickness of an erodible coating deposited on the electrosurgical instrument, the method comprising: measuring at least one resistive value corresponding to the thickness of the erodible coating; comparing at least one measured resistive value to a threshold resistive value corresponding to a minimum thickness of the erodible coating before which the erodible coating changes from a first state to a second state; determining the erodible coating has eroded to the minimum thickness when the measured resistive value is less than or equal to the threshold resistive value; and inhibiting activation of the power source of the electrosurgical generator to prevent output of electrical energy to the electrosurgical instrument.

In Example 23, the subject matter of Example 22 includes, wherein the method first includes obtaining the threshold resistive value by exchanging information between a memory or RFID or NFC transceiver of the electrosurgical generator and a memory or an RFID or NFC tag of the electrosurgical instrument, respectively.

In Example 24, the subject matter of Examples 22-23 includes, wherein comparing the at least one measured resistive value to the threshold resistive value is performed by the electrosurgical generator upon each activation of the power source.

In Example 25, the subject matter of Examples 22-24 includes, wherein comparing the at least one measured resistive value to the threshold resistive value includes calculating an average resistive value from a plurality of measured resistive values, and wherein the at least one measured resistive value is the average resistive value.

In Example 26, the subject matter of Examples 22-25 includes, wherein determining the erodible coating has eroded to the minimum thickness includes storing information on a memory or an RFID or NFC tag of the electrosurgical instrument indicating that the erodible coating has eroded to the minimum thickness.

In Example 27, the subject matter of Examples 22-26 includes, wherein determining the erodible coating has eroded to the minimum thickness includes generating an audible or visual alert.

In Example 28, the subject matter of Examples 22-27 includes, wherein determining the erodible coating has eroded to the minimum thickness includes initiating a timer before the minimum thickness is reached to prevent the electrosurgical generator from inhibiting activation of the power source when a time window has elapsed.

In Example 29, the subject matter of Examples 22-28 includes, wherein measuring the at least one resistive value includes pivoting a first jaw and a second jaw from an open position to a closed position to engage biological tissue located therebetween.

In Example 30, the subject matter of Examples 22-29 includes, wherein measuring the at least one resistive value includes pivoting a first jaw and a second jaw from an open position to a closed position to cause a first electrode plate located on the first jaw to contact a second electrode plate located on the second jaw.

In Example 31, the subject matter of Examples 22-30 includes, wherein determining the erodible coating has eroded to the minimum thickness includes measuring at least one resistive value corresponding to a conductive electrical contact, or a short circuit, within the electrosurgical instrument at a jaw stop.

Example 32 is at least one machine-readable medium including instructions that, when executed by processing circuitry, cause the processing circuitry to perform operations to implement of any of Examples 1-31.

Example 33 is an apparatus comprising means to implement of any of Examples 1-31.

Example 34 is a system to implement of any of Examples 1-31.

Example 35 is a method to implement of any of Examples 1-31.

What is claimed is:

1. An electrosurgical generator configured to generate electrical energy to be applied to biological tissue via electrical communication with an electrosurgical instrument, the electrosurgical generator comprising:
   a power source configured to activate to output the electrical energy to the electrosurgical instrument;
   a measurement circuit configured to measure a resistive value associated with an erodible coating deposited on a portion of the electrosurgical instrument; and
   a control circuit in communication with the power source and the measurement circuit, the control circuit configured to:
      compare a measured resistive value of the erodible coating to a threshold resistive value of the erodible coating, wherein the threshold resistive value comprises an intermediate resistive value for a threshold thickness of the erodible coating that is above a terminal resistance value where the erodible coating is nearly completely eroded; and
      control activation of the power source based on the comparison between the measured resistive value and the threshold resistive value.

2. The electrosurgical generator of claim 1, wherein thicknesses of the erodible coating below the threshold thickness are ineffective in functioning to inhibit tissue adhering to the erodible coating.

3. The electrosurgical generator of claim 2, wherein an initial thickness of the erodible coating has a surface adherence to the biological tissue that is less than a surface adherence to the biological tissue of a material of the portion of the electrosurgical instrument that the erodible coating is disposed on.

4. The electrosurgical generator of claim 2, wherein the control circuit is configured to initiate a timer starting when the measured resistive value is greater than the threshold resistive value by a predetermined percentage, wherein the control circuit is further configured to inhibit activation of the power source after the timer has elapsed, wherein the timer comprises a time period for remaining activations of the electrosurgical generator that expires before a thickness of the erodible coating falls below the threshold thickness.

5. The electrosurgical generator of claim 4, wherein the electrosurgical generator includes a user interface in electrical communication with the control circuit, and wherein the control circuit is configured to cause the user interface to output an audible or a visual alert upon initiating the timer.

6. The electrosurgical generator of claim 2, wherein the control circuit is configured to count a number of activations of the power source starting when the measured resistive value is greater than the threshold resistive value by a predetermined percentage, wherein the control circuit is further configured to inhibit activation of the power source after a threshold number of power source activations has occurred, wherein the threshold number of power source activations sets forth a quantity of remaining activations of the electrosurgical generator less than a number of activations that cause a thickness of the erodible coating to fall below the threshold thickness.

7. The electrosurgical generator of claim 1, wherein the erodible coating is a non-stick hydrophobic layer selected from one of polydimethylsiloxane, hexadimethyldisiloxane, and tetramethyldisiloxane.

8. The electrosurgical generator of claim 1, wherein the measured resistive value and the threshold resistive value are indicative of at least one of resistance, impedance, or phase angle, and wherein the control circuit is configured to compare the measured resistive value to the threshold resistive value upon each activation of the power source.

9. The electrosurgical generator of claim 1, wherein the control circuit is configured to control activation of the power source by inhibiting activation of the power source if the measured resistive value is less than or equal to the threshold resistive value.

10. The electrosurgical generator of claim 9, wherein the electrosurgical generator includes a user interface in electrical communication with the control circuit, and wherein the control circuit is configured to cause the user interface to output an audible or a visual alert upon inhibiting activation of the power source.

11. The electrosurgical generator of claim 1, wherein the electrosurgical generator includes a user interface in electrical communication with the control circuit, and wherein the control circuit is configured to cause the user interface to output an audible or a visual alert if the measured resistive value is less than or equal to a reference resistive value, and wherein the reference resistive value is greater than the threshold resistive value.

12. The electrosurgical generator of claim 1, wherein the measured resistive value is an average value of a plurality of measured resistive values, and wherein the control circuit is configured to store the plurality of measured resistive values and periodically calculate the average value from the plurality of measured resistive values.

13. The electrosurgical generator of claim 1, wherein the control circuit is in electrical communication with a database including a plurality of database entries each defining a threshold resistive value of a different electrosurgical instrument, wherein the electrosurgical instrument includes a memory containing data matchable by the control circuit to an individual database entry.

14. The electrosurgical generator of claim 1, wherein the threshold resistive value is a resistive value corresponding to a conductive electrical contact, or a short circuit, within the electrosurgical instrument when the erodible coating has eroded to a thickness before which the erodible coating changes from a first state to a second state or a previously measured resistive value representing a starting resistive value of the erodible coating.

15. An electrosurgical system, comprising:
an electrosurgical instrument configured to apply electrical energy to biological tissue; and
an electrosurgical generator for providing the electrical energy to the electrosurgical instrument, the electrosurgical generator including:
an electrical connector configured to electrically couple the electrosurgical instrument to the electrosurgical generator;
a power source configured to activate to output the electrical energy to the electrosurgical instrument;
a measurement circuit configured to measure a resistive value associated with erosion of an erodible coating due to activation of the power source deposited on a portion of the electrosurgical instrument; and
a control circuit including a generator component located within the electrosurgical generator and an instrument component located within the electrosurgical instrument, the control circuit configured to:
compare a measured resistive value of the erodible coating to a threshold resistive value of the erodible coating;
control activation of the power source based on the comparison between the measured resistive value and the threshold resistive value;
count a number of activations of the power source starting when the measured resistive value is greater than the threshold resistive value by a predetermined percentage; and
inhibit activation of the power source after a threshold number of power source activations has occurred, wherein the threshold number of power source activations sets forth a quantity of remaining activations of the electrosurgical generator less than a number of activations that cause a thickness of the erodible coating to fall below a threshold thickness where the erodible coating is nearly completely eroded.

16. The electrosurgical system of claim 15, wherein the generator component is a memory of the control circuit or an RFID or NFC transceiver, and the instrument component is a programmable memory or an RFID or NFC tag, respectively.

17. The electrosurgical system of claim 15, wherein:
the erodible coating comprises a non-stick coating configured to prevent tissue from adhering to the electrosurgical instrument;
a thickness of the erodible coating is configured to erode;
the threshold resistive value corresponds to a minimum thickness of the erodible coating before which the erodible coating changes from a first state to a second state; and
the control circuit is configured to store information on the instrument component or the generator component relating to the minimum thickness.

18. The electrosurgical system of claim 17, wherein the electrosurgical instrument is a forceps including:
a first jaw and a second jaw pivotable between an open position and a closed position, the first jaw including a jaw stop extending outwardly from the first jaw toward the second jaw, wherein the jaw stop is in electrical communication with the control circuit and is configured to contact the second jaw when the first jaw and the second jaw are in the closed position, and wherein the erodible coating is deposited on at least one of: the jaw stop, along a portion of the first jaw, along a portion of the second jaw.

19. The electrosurgical system of claim 18, further comprising a plurality of jaw stops spaced laterally apart relative to one another along the first jaw, wherein at least one of the plurality of jaw stops is in electrical communication with the control circuit and at least one of the plurality of jaw stops is electrically insulative.

20. The electrosurgical system of claim 19, wherein the measured resistive value is an average value of a plurality of measured resistive values measured at a first jaw stop in electrical communication with the control circuit, and wherein the control circuit is configured to calculate the average value from the plurality of measured resistive values.

21. The electrosurgical system of claim 18, wherein the threshold resistive value is a resistive value corresponding to a conductive electrical contact, or a short circuit, within the electrosurgical instrument, wherein the jaw stop includes a plurality of electrically conductive strands extending between the first jaw and a distal surface of the jaw stop, and wherein the electrically conductive strands are configured to cause the conductive electrical contact, or the short circuit, within the electrosurgical instrument when the erodible coating has eroded to the minimum thickness.

22. A method for controlling output of electrical energy from an electrosurgical generator to an interconnected electrosurgical instrument based on a thickness of an erodible coating deposited on the electrosurgical instrument, the method comprising:
   measuring at least one resistive value corresponding to the thickness of the erodible coating;
   comparing at least one measured resistive value to a threshold resistive value corresponding to a minimum thickness of the erodible coating before which the erodible coating changes from a first state to a second state, wherein the threshold resistive value comprises an intermediate resistive value for a threshold thickness of the erodible coating that is above a terminal resistance value where the erodible coating is nearly completely eroded;
   determining the erodible coating has eroded to the minimum thickness when the measured resistive value is less than or equal to the threshold resistive value; and
   inhibiting activation of a power source of the electrosurgical generator to prevent output of electrical energy to the electrosurgical instrument.

* * * * *